United States Patent
Huffman et al.

(10) Patent No.: US 11,996,117 B2
(45) Date of Patent: May 28, 2024

(54) MULTI-STAGE ADAPTIVE SYSTEM FOR CONTENT MODERATION

(71) Applicant: Modulate, Inc., Cambridge, MA (US)

(72) Inventors: William Carter Huffman, Cambridge, MA (US); Michael Pappas, Cambridge, MA (US); Henry Howie, Hull, MA (US)

(73) Assignee: Modulate, Inc.

( * ) Notice: Subject to any disclaimer, the term of this patent is extended or adjusted under 35 U.S.C. 154(b) by 412 days.

(21) Appl. No.: 17/497,862

(22) Filed: Oct. 8, 2021

(65) Prior Publication Data

US 2022/0115033 A1   Apr. 14, 2022

Related U.S. Application Data

(60) Provisional application No. 63/089,226, filed on Oct. 8, 2020.

(51) Int. Cl.
| | |
|---|---|
| *G10L 25/63* | (2013.01) |
| *G06N 5/022* | (2023.01) |
| *G10L 15/02* | (2006.01) |
| *G10L 15/06* | (2013.01) |

(52) U.S. Cl.
CPC .............. *G10L 25/63* (2013.01); *G06N 5/022* (2013.01); *G10L 15/02* (2013.01); *G10L 15/063* (2013.01)

(58) Field of Classification Search
CPC ....... G10L 25/63; G10L 15/02; G10L 15/063; G06N 5/022
USPC ........................................................ 704/231
See application file for complete search history.

(56) References Cited

U.S. PATENT DOCUMENTS

| | | | |
|---|---|---|---|
| 5,327,521 | A | 7/1994 | Savic et al. |
| 5,677,989 | A | 10/1997 | Rabin et al. |
| 5,704,006 | A | 12/1997 | Iwahashi |
| 5,758,023 | A | 5/1998 | Bordeaux |
| 5,808,222 | A | 9/1998 | Yang |
| 6,161,091 | A | 12/2000 | Akamine et al. |
| 6,307,140 | B1 | 10/2001 | Iwamoto |

(Continued)

FOREIGN PATENT DOCUMENTS

| | | |
|---|---|---|
| CN | 101359473 A | 2/2009 |
| CN | 102982809 A | 3/2013 |

(Continued)

OTHER PUBLICATIONS

International Search Report and Written Opinion for International Application No. PCT/US23/17930, mailed Aug. 11, 2023, 7 pages.

(Continued)

*Primary Examiner* — Susan I McFadden
(74) *Attorney, Agent, or Firm* — Nutter McClennen & Fish LLP

(57) ABSTRACT

A toxicity moderation system has an input configured to receive speech from a speaker. The system includes a multi-stage toxicity machine learning system having a first stage and a second stage. The first stage is trained to analyze the received speech to determine whether a toxicity level of the speech meets a toxicity threshold. The first stage is also configured to filter-through, to the second stage, speech that meets the toxicity threshold, and is further configured to filter-out speech that does not meet the toxicity threshold.

20 Claims, 12 Drawing Sheets

(56) References Cited

U.S. PATENT DOCUMENTS

| | | |
|---|---|---|
| 6,336,092 B1 | 1/2002 | Gibson et al. |
| 7,117,154 B2 | 10/2006 | Yoshioka et al. |
| 7,412,377 B2 | 8/2008 | Monkowski |
| 7,565,697 B2 | 7/2009 | LeVine et al. |
| 7,590,532 B2 | 9/2009 | Suzuki et al. |
| 7,634,410 B2 | 12/2009 | Lemoine et al. |
| 7,664,645 B2 | 2/2010 | Hain et al. |
| 7,881,944 B2 | 2/2011 | Heller et al. |
| 7,987,244 B1 | 7/2011 | Lewis et al. |
| 8,060,565 B1 | 11/2011 | Swartz |
| 8,121,845 B2 | 2/2012 | Kirby |
| 8,131,550 B2 | 3/2012 | Nurminen et al. |
| 8,156,518 B2 | 4/2012 | O'Hern |
| 8,290,772 B1 | 10/2012 | Cohen et al. |
| 8,473,281 B2 | 6/2013 | Maude et al. |
| 8,930,183 B2 | 1/2015 | Chun et al. |
| 9,009,052 B2 | 4/2015 | Nakano et al. |
| 9,135,923 B1 | 9/2015 | Chen |
| 9,148,630 B2 | 9/2015 | Morris et al. |
| 9,153,235 B2 | 10/2015 | Zhang et al. |
| 9,183,830 B2 | 11/2015 | Agiomyrgiannakis |
| 9,305,530 B1 | 4/2016 | Durham et al. |
| 9,532,136 B2 | 12/2016 | Uhle et al. |
| 9,589,574 B1 | 3/2017 | Klimanis et al. |
| 9,591,427 B1 | 3/2017 | Lyren et al. |
| 9,800,721 B2 | 10/2017 | Gainsboro et al. |
| 10,046,237 B2 | 8/2018 | Rom et al. |
| 10,186,251 B1 | 1/2019 | Mohammadi |
| 10,198,667 B2 | 2/2019 | Ryan, Jr. et al. |
| 10,357,713 B1 | 7/2019 | Landers et al. |
| 10,361,673 B1 | 7/2019 | Matsukawa |
| 10,453,476 B1 | 10/2019 | Aryal |
| 10,614,826 B2 | 4/2020 | Huffman et al. |
| 10,622,002 B2 | 4/2020 | Huffman et al. |
| 10,706,839 B1 | 7/2020 | Stephenson |
| 10,706,867 B1 | 7/2020 | Villavicencio et al. |
| 10,708,687 B1 | 7/2020 | Gedney et al. |
| 10,807,006 B1 | 10/2020 | Davis et al. |
| 10,861,476 B2 | 12/2020 | Huffman et al. |
| 10,912,989 B2 | 2/2021 | Kornmann et al. |
| 10,918,956 B2 | 2/2021 | Rout et al. |
| 10,922,534 B2 | 2/2021 | Zavesky et al. |
| 10,936,817 B2 | 3/2021 | Agarwal et al. |
| 10,940,396 B2 | 3/2021 | Pinto et al. |
| 10,987,592 B1 | 4/2021 | Schaeppi et al. |
| 10,994,209 B2 | 5/2021 | Miyaki |
| 10,997,494 B1 | 5/2021 | Ng et al. |
| 11,010,687 B2 | 5/2021 | Mehdad et al. |
| 11,017,788 B2 | 5/2021 | Huffman et al. |
| 11,056,131 B2 | 7/2021 | Kulavik et al. |
| 11,090,566 B1 | 8/2021 | Chow |
| 11,170,800 B2 * | 11/2021 | McAlpine ............ A63F 13/424 |
| 11,235,248 B1 | 2/2022 | Orrino et al. |
| 11,266,912 B2 | 3/2022 | Dorn et al. |
| 11,278,815 B2 | 3/2022 | Kulavik et al. |
| 11,358,066 B2 | 6/2022 | Hume et al. |
| 11,538,485 B2 | 12/2022 | Huffman et al. |
| 11,714,967 B1 | 8/2023 | Wu et al. |
| 2001/0044721 A1 | 11/2001 | Yoshioka et al. |
| 2002/0046899 A1 | 4/2002 | Mizuno et al. |
| 2002/0072900 A1 | 6/2002 | Keough et al. |
| 2002/0086653 A1 | 7/2002 | Kim |
| 2002/0120854 A1 | 8/2002 | LeVine et al. |
| 2003/0154080 A1 | 8/2003 | Godsey et al. |
| 2003/0158734 A1 | 8/2003 | Cruickshank |
| 2004/0010798 A1 | 1/2004 | Galli et al. |
| 2005/0064374 A1 | 3/2005 | Spector |
| 2005/0108227 A1 | 5/2005 | Russell-Falla et al. |
| 2005/0131680 A1 | 6/2005 | Chazan et al. |
| 2006/0003305 A1 | 1/2006 | Kelmar |
| 2006/0095262 A1 | 5/2006 | Danieli |
| 2006/0210956 A1 | 9/2006 | Okamoto |
| 2006/0268007 A1 | 11/2006 | Gopalakrishnan |
| 2007/0112568 A1 | 5/2007 | Fingscheidt et al. |
| 2008/0034231 A1 | 2/2008 | Ginter et al. |
| 2008/0082320 A1 | 4/2008 | Popa et al. |
| 2008/0201150 A1 | 8/2008 | Tamura et al. |
| 2008/0221882 A1 | 9/2008 | Bundock et al. |
| 2008/0243511 A1 | 10/2008 | Fujita et al. |
| 2008/0255830 A1 | 10/2008 | Rosec et al. |
| 2008/0262838 A1 | 10/2008 | Nurminen et al. |
| 2008/0269633 A1 | 10/2008 | Watson |
| 2009/0034704 A1 | 2/2009 | Ashbrook et al. |
| 2009/0037179 A1 | 2/2009 | Liu et al. |
| 2009/0055189 A1 | 2/2009 | Stuart et al. |
| 2009/0089063 A1 | 4/2009 | Meng et al. |
| 2009/0094027 A1 | 4/2009 | Nurminen et al. |
| 2009/0177473 A1 | 7/2009 | Aaron et al. |
| 2010/0049522 A1 | 2/2010 | Tamura et al. |
| 2010/0082326 A1 | 4/2010 | Bangalore et al. |
| 2010/0088089 A1 | 4/2010 | Hardwick |
| 2010/0094620 A1 | 4/2010 | Hardwick |
| 2010/0198600 A1 | 8/2010 | Masuda |
| 2010/0215289 A1 | 8/2010 | Pradeep et al. |
| 2011/0098029 A1 | 4/2011 | Rhoads et al. |
| 2011/0125493 A1 | 5/2011 | Hirose et al. |
| 2011/0161348 A1 | 6/2011 | Oron |
| 2011/0191105 A1 | 8/2011 | Spears |
| 2011/0218804 A1 | 9/2011 | Chun |
| 2012/0095762 A1 | 4/2012 | Eom et al. |
| 2012/0095767 A1 | 4/2012 | Hirose et al. |
| 2012/0116756 A1 | 5/2012 | Kalinli |
| 2012/0166187 A1 | 6/2012 | Van Buskirk et al. |
| 2012/0253794 A1 | 10/2012 | Chun et al. |
| 2012/0253812 A1 | 10/2012 | Kalinli et al. |
| 2013/0025437 A1 | 1/2013 | Serletic et al. |
| 2013/0080164 A1 | 3/2013 | Zanolin et al. |
| 2013/0144603 A1 | 6/2013 | Lord et al. |
| 2013/0150117 A1 | 6/2013 | Rodriguez et al. |
| 2013/0151256 A1 | 6/2013 | Nakano et al. |
| 2013/0166274 A1 | 6/2013 | Fagundes et al. |
| 2013/0203027 A1 | 8/2013 | De Villers-Sidani et al. |
| 2013/0268273 A1 | 10/2013 | Chen et al. |
| 2013/0311189 A1 | 11/2013 | Villavicencio et al. |
| 2014/0046660 A1 | 2/2014 | Kamdar |
| 2014/0074459 A1 | 3/2014 | Chordia et al. |
| 2014/0088958 A1 | 3/2014 | Chen |
| 2014/0088968 A1 | 3/2014 | Chen |
| 2014/0114655 A1 | 4/2014 | Kalinli-Akbacak |
| 2014/0122081 A1 | 5/2014 | Kaszczuk et al. |
| 2014/0136013 A1 | 5/2014 | Wolverton et al. |
| 2014/0136187 A1 | 5/2014 | Wolverton et al. |
| 2014/0149112 A1 | 5/2014 | Kalinli-Akbacak |
| 2014/0180673 A1 | 6/2014 | Neuhauser et al. |
| 2014/0180675 A1 | 6/2014 | Neuhauser et al. |
| 2014/0195242 A1 | 7/2014 | Chen |
| 2014/0200889 A1 | 7/2014 | Chen |
| 2014/0245329 A1 | 8/2014 | Kato et al. |
| 2014/0274386 A1 | 9/2014 | Ault et al. |
| 2015/0005661 A1 | 1/2015 | Trammell |
| 2015/0025892 A1 | 1/2015 | Lee et al. |
| 2015/0052594 A1 | 2/2015 | Liberman et al. |
| 2015/0058015 A1 | 2/2015 | Mitsufuji et al. |
| 2015/0063573 A1 | 3/2015 | Daly |
| 2015/0127350 A1 | 5/2015 | Agiomyrgiannakis |
| 2015/0161753 A1 | 6/2015 | Blesser |
| 2015/0255074 A1 | 9/2015 | Jeong et al. |
| 2015/0279349 A1 | 10/2015 | Byron et al. |
| 2015/0356967 A1 | 12/2015 | Byron et al. |
| 2015/0379752 A1 | 12/2015 | Li et al. |
| 2016/0005403 A1 | 1/2016 | Agiomyrgiannakis et al. |
| 2016/0036961 A1 | 2/2016 | Lee |
| 2016/0111108 A1 | 4/2016 | Erdogan et al. |
| 2016/0196630 A1 | 7/2016 | Blesser |
| 2016/0260425 A1 | 9/2016 | Saino et al. |
| 2016/0300582 A1 | 10/2016 | Vaillancourt et al. |
| 2016/0378427 A1 | 12/2016 | Sharma et al. |
| 2016/0379641 A1 | 12/2016 | Liu et al. |
| 2017/0018270 A1 | 1/2017 | Min |
| 2017/0048176 A1 | 2/2017 | Onusko et al. |
| 2017/0125008 A1 | 5/2017 | Maisonnier et al. |
| 2017/0133005 A1 | 5/2017 | Mason |
| 2017/0142548 A1 | 5/2017 | Buskirk et al. |
| 2017/0149961 A1 | 5/2017 | Kim et al. |

(56) References Cited

U.S. PATENT DOCUMENTS

| | | |
|---|---|---|
| 2017/0249953 A1 | 8/2017 | Yassa et al. |
| 2018/0040324 A1 | 2/2018 | Wilberding |
| 2018/0053261 A1 | 2/2018 | Hershey |
| 2018/0097841 A1 | 4/2018 | Stolarz et al. |
| 2018/0108370 A1 | 4/2018 | Dow et al. |
| 2018/0137875 A1 | 5/2018 | Liu et al. |
| 2018/0146370 A1 | 5/2018 | Krishnaswamy et al. |
| 2018/0182397 A1 | 6/2018 | Carbune et al. |
| 2018/0225083 A1 | 8/2018 | Barkley et al. |
| 2018/0276710 A1 | 9/2018 | Tietzen et al. |
| 2018/0277113 A1 | 9/2018 | Hartung et al. |
| 2018/0316709 A1 | 11/2018 | Purian |
| 2018/0336713 A1 | 11/2018 | Avendano et al. |
| 2018/0342256 A1 | 11/2018 | Huffman et al. |
| 2018/0342257 A1 | 11/2018 | Huffman et al. |
| 2018/0342258 A1 | 11/2018 | Huffman et al. |
| 2019/0013038 A1 | 1/2019 | Thomson et al. |
| 2019/0051276 A1 | 2/2019 | Lathrop et al. |
| 2019/0052471 A1 | 2/2019 | Panattoni et al. |
| 2019/0364126 A1 | 11/2019 | Todd |
| 2019/0378024 A1 | 12/2019 | Singh et al. |
| 2020/0005773 A1 | 1/2020 | Schmidt et al. |
| 2020/0099640 A1 | 3/2020 | Andre et al. |
| 2020/0125639 A1 | 4/2020 | Doyle |
| 2020/0125928 A1 | 4/2020 | Doyle |
| 2020/0129864 A1 | 4/2020 | Tran et al. |
| 2020/0142999 A1 | 5/2020 | Pedersen |
| 2020/0164278 A1 | 5/2020 | Andre et al. |
| 2020/0187841 A1 | 6/2020 | Ayyad |
| 2020/0219488 A1 | 7/2020 | Bender et al. |
| 2020/0243101 A1 | 7/2020 | Huffman et al. |
| 2020/0314152 A1 | 10/2020 | Andre et al. |
| 2020/0335090 A1 | 10/2020 | Freed et al. |
| 2021/0050025 A1 | 2/2021 | Huffman et al. |
| 2021/0201893 A1 | 7/2021 | Lyu et al. |
| 2021/0224858 A1 | 7/2021 | Khoury et al. |
| 2021/0234823 A1 | 7/2021 | Levkovitz et al. |
| 2021/0256985 A1 | 8/2021 | Huffman et al. |
| 2021/0322887 A1 | 10/2021 | Schaeppi |
| 2021/0329124 A1 | 10/2021 | Li et al. |
| 2021/0370188 A1 | 12/2021 | Thomas et al. |
| 2021/0402304 A1 | 12/2021 | Dorn et al. |
| 2022/0008830 A1 | 1/2022 | Valencia |
| 2022/0032199 A1 | 2/2022 | Rudi et al. |
| 2022/0096937 A1 | 3/2022 | Dorn et al. |
| 2022/0111297 A1 | 4/2022 | Rudi et al. |
| 2022/0184502 A1 | 6/2022 | Vogel |
| 2022/0203244 A1 | 6/2022 | Ng et al. |
| 2022/0207421 A1 | 6/2022 | Fong et al. |
| 2022/0224792 A1 | 7/2022 | Horton et al. |

FOREIGN PATENT DOCUMENTS

| | | |
|---|---|---|
| CN | 107293289 A | 10/2017 |
| JP | 2006319598 A | 11/2006 |
| KR | 101665882 B1 | 10/2016 |
| KR | 101666930 B1 | 10/2016 |
| WO | 2018218081 A1 | 11/2018 |

OTHER PUBLICATIONS

International Search Report and Written Opinion for International Application No. PCT/US23/24193, mailed Oct. 24, 2023, 12 pages.
International Search Report and Written Opinion for International Application No. PCT/US2018/034485, mailed Sep. 25, 2018, 21 pages.
Anderson F Machado et al: "Voice Conversion: A Critical SURVEYe/pjp", Jan. 1, 2010, Jan. 1, 2010 (Jan. 1, 2010), pp. 1-8, XP007921050, Retrieved from the Internet: URL:www.ime.usp.br/-mqz/SMC2010Voice.pdf.
Arik et al.—"Neural Voice Cloning with a Few Samples," arXiv:1802.06006 [cs.CL], 17 pages, Mar. 20, 2018.
Arjovsky et al.—"Wasserstein GAN," arXiv:1701.07875 [stat.ML], 32 pages, Dec. 6, 2017.
Arora et al., "Real-Time Adaptive Speech Watermarking Scheme for Mobile Applications", Dec. 18, 2003, retrieved on [Nov. 25, 2020]. Retrieved from the internet ?URL:https://ieexplore.ieee.org/stamp/stamp.sp?tp=&arnumber= 1292641? 5 pages.
De Brébisson et al.—"Create a digital copy of your voice with one minute of audio," Lyrebird, https://lyrebird.ai, 1 page showing URL provided, 2017.
Desai, S., et al., "Spectral Mapping Using Artificial Neural Networks for Voice Conversion," IEEE Transactions on Audio, Speech, and Language Processing, vol. 18, No. 5, Jul. 2010, pp. 954-964.
Extended European Search Report issued by the European Patent Office for corresponding European Patent Application No. 18806567.6, dated Jan. 21, 2022.
Goodfellow et al.—"Generative Adversarial Nets," arXiv:1406.2661 [stat.ML], 9 pages, Jun. 10, 2014.
Gulrajani et al.—"Improved Training of Wasserstein GANs," arXiv:1704.00028 [cs.LG], 20 pages, Dec. 25, 2017.
Hong—"RNN GAN Based General Voice Conversion-Pitch," Youtube, Retrieved from https://www.youtube.com/watch?v=ULWLIeBDCEY, 1 page showing URL provided, Jan. 12, 2018.
Hsu et al.—"Voice Conversion from Unaligned Corpora using Variational Autoencoding Wasserstein Generative Adversarial Networks," arXiv:1704.00849 [cs.CL], 5 pages, Jun. 8, 2017.
International Searching Authority, International Search Report—International Application No. PCT/US2020/046534, dated Jan. 5, 2021, together with the Written Opinion of the International Searching Authority, 23 pages.
International Searching Authority, International Search Report—International Application No. PCT/US2021/054319, dated Feb. 14, 2022, together with the Written Opinion of the International Searching Authority, 14 pages.
Kaneko et al.—"Sequence-to-Sequence Voice Conversion with Similarity Metric Learned Using Generative Adversarial Networks," Interspeech 2017, pp. 1283-1287, Aug. 2017.
Kaneko et al.—"Parallel-Data-Free Voice Conversion Using Cycle-Consistent Adversarial Networks," arXiv:1711.11293 [stat.ML], 5 pages, Dec. 20, 2017.
Lorenzo-Trueba et al.—"Can we steal your vocal identity from the Internet?: Initial investigation of cloning Obama's voice using GAN, WaveNet and low-quality found data," arXiv:1803.00860 [eess.AS], 8 pages, Mar. 2, 2018.
Machado, A., et al. "Voice Conversion: A Critical Survey," retrieved from https://www.ime.usp.br/~mqz/SMC2010_Voice.pdf, pp. 291-298, published in 2010.
Ming Huaiping et al: "Exemplar-based sparse representation of timbre and prosody for voice conversion", 2016 IEEE International Conference on Acoustics, Speech and Signal Processing (ICASSP), IEEE, Mar. 20, 2016 (Mar. 20, 2016), pp. 5175-5179, XP032901590, DOI: 10.1109/ICASSP.2016.7472664 [retrieved on May 18, 2016] *D2, p. 1, left column, lines 6-9 of the introduction *.
Mobin et al.—"Voice Conversion using Convolutional Neural Networks," 2016 Machine Learning Summer School, Abstract, 6 pages (Sep. 2018).
Nachmani et al.—"Fitting New Speakers Based on a Short Untranscribed Sample," arXiv:1802.06984 [cs.LG], 9 pages, Feb. 20, 2018.
Oyamada et. al.—"Non-native speech conversion with consistency-aware recursive network and generative adversarial network," Proceedings of APSIPA Annual Summit and Conference, 7 pages, Dec. 2017.
Sallmans et al.—"Improved Techniques for Training GANs," arXiv:1606.03498 [cs.LG], 10 pages, Jun. 10, 2016.
Srinivas Desai et al: "Spectral Mapping Using Artificial Neural Networks for Voice Conversion", IEEE Transactions on Audio, Speech and Language Processing, IEEE, US, vol. 18, No. 5, Jul. 1, 2010 (Jul. 1, 2010), pp. 954-964, XP011329177, ISSN: 1558-7916, DOI: 10.1109/TASL.2010.2047683 *Section II-A, II-B* *abstract *.

* cited by examiner

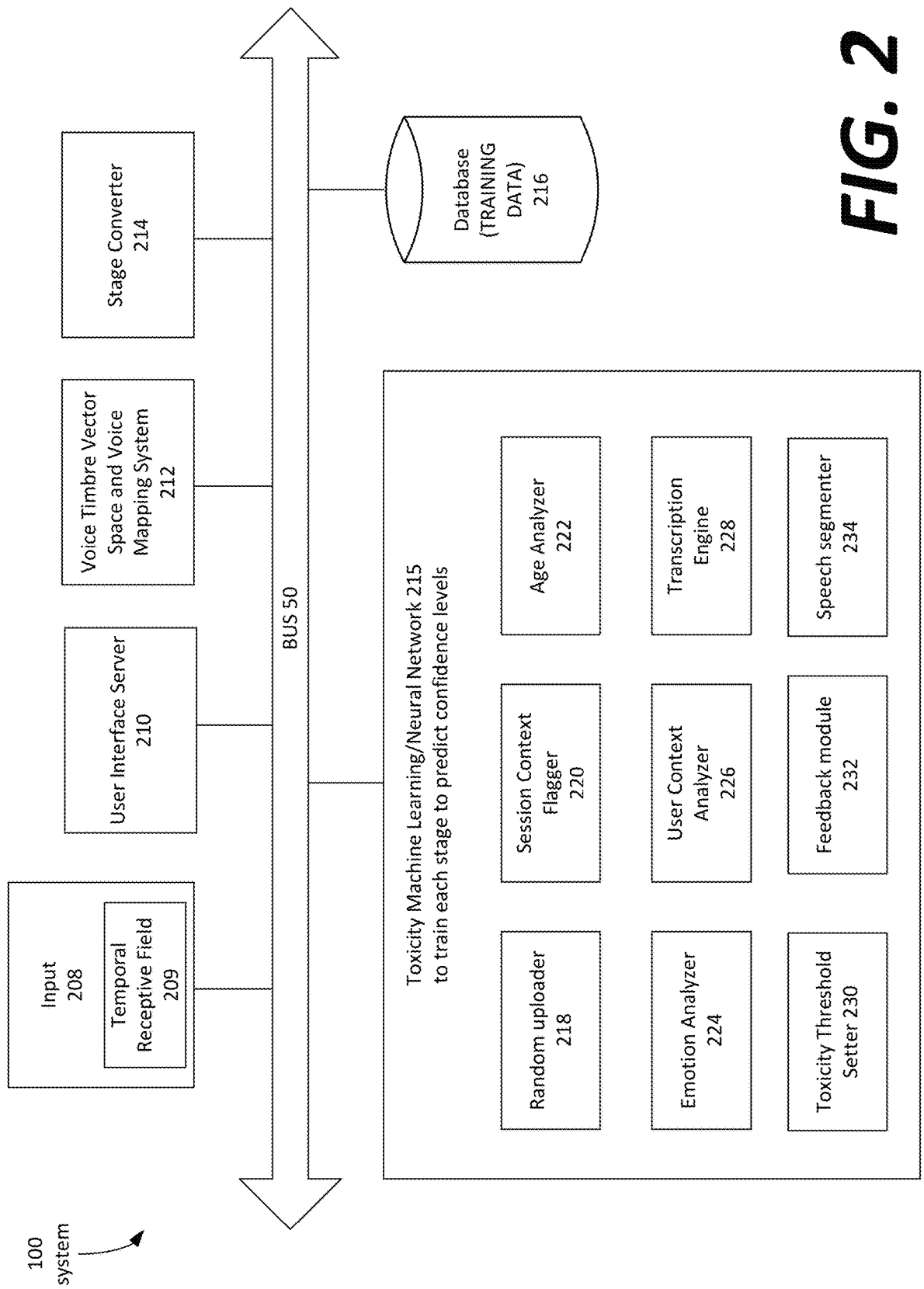

MULTI-STAGE ADAPTIVE SYSTEM FOR CONTENT MODERATION

PRIORITY

This patent application claims priority from provisional U.S. patent application Ser. No. 63/089,226 filed Oct. 8, 2020, entitled, "MULTI-STAGE ADAPTIVE SYSTEM FOR CONTENT MODERATION," and naming William Carter Huffman, Michael Pappas, and Henry Howie as inventors, the disclosure of which is incorporated herein, in its entirety, by reference.

FIELD OF THE INVENTION

Illustrative embodiments of the invention generally relate to moderation of content and, more particularly, the various embodiments of the invention relate to moderating voice content in an online environment.

BACKGROUND OF THE INVENTION

Large multi-user platforms that allow communication between users, such as Reddit, Facebook, and video games, encounter problems with toxicity and disruptive behavior, where some users can harass, offend, or demean others, discouraging them from participating on the platform. Disruptive behavior is typically done through text, speech, or video media; such as verbally harassing another user in voice chat, or posting an offensive video or article. Disruptive behavior can also be through intentionally sabotaging team-based activities, such as one player of a team game intentionally underperforming in order to upset their teammates. These actions affect the users and the platform itself: users encountering disruptive behavior may be less likely to engage with the platform, or for shorter periods of time; and sufficiently egregious behavior may cause users to abandon the platform outright.

Platforms can directly counter disruptive behavior through content moderation, which observes users of the platform and takes action when disruptive content is found. Reactions can be direct, such as temporarily or permanently banning users who harass others; or subtle, such as grouping together toxic users in the same circles, leaving the rest of the platform clean. Traditional content moderation systems fall into two camps: those that are highly automated but easy to circumvent and only exist in certain domains, and those that are accurate but highly manual, slow, and expensive.

SUMMARY OF VARIOUS EMBODIMENTS

In accordance with one embodiment of the invention, a toxicity moderation system has an input configured to receive speech from a speaker. The system includes a multi-stage toxicity machine learning system having a first stage and a second stage. The first stage is trained to analyze the received speech to determine whether a toxicity level of the speech meets a toxicity threshold. The first stage is also configured to filter-through, to the second stage, speech that meets the toxicity threshold, and is further configured to filter-out speech that does not meet the toxicity threshold.

In various embodiments, the first stage is trained using a database having training data with positive and/or negative examples of training content for the first stage. The first stage may be trained using a feedback process. The feedback process may receive speech content, and analyze the speech content using the first stage to categorize the speech content as having first-stage positive speech content and/or first-stage negative speech content. The feedback process may also analyze the first-stage positive speech content using the second stage to categorize the first-stage positive speech content as having second-stage positive speech content and/or second-stage negative speech content. The feedback process may also update the database using the second-stage positive speech content and/or the second-stage negative speech content.

To assist with efficiency of the overall system, the first stage may discard at least a portion of the first-stage negative speech content. Furthermore, the first stage may be trained using a feedback process that includes using the second stage to analyze less than all of the first-stage negative speech content so as to categorize the first-stage negative speech content as having second-stage positive speech content and/or second-stage negative speech content. The feedback process may update the database using the second-stage positive speech content and/or the second-stage negative speech content.

Among other things, the toxicity moderation system may include a random uploaded configured to upload portions of the speech that did not meet the toxicity threshold to the subsequent stage or a human moderator. The system may include a session context flagger configured to receive an indication that the speaker previously met the toxicity threshold within a pre-determined amount of time. When the indication is received, the flagger may: (a) adjust the toxicity threshold, or (b) upload portions of the speech that did not meet the toxicity threshold to the subsequent stage or a human moderator.

The toxicity moderation system may also include a user context analyzer. The user context analyzer is configured to adjust the toxicity threshold and/or the toxicity confidence based on the speaker's age, a listener's age, the speaker's geographic region, the speaker's friends list, history of recently interacted listeners, speaker's gameplay time, length of speaker's game, time at beginning of game and end of game, and/or gameplay history. The system may include an emotion analyzer trained to determine an emotion of the speaker. The system may also include an age analyzer trained to determine an age of the speaker.

In various embodiments, the system has a temporal receptive field configured to divide speech into time segments that can be received by at least one stage. The system also has a speech segmenter configured to divide speech into time segments that can be analyzed by at least one stage. In various embodiments, the first stage is more efficient than the second stage.

In accordance with another embodiment, a multi-stage content analysis system includes a first stage trained using a database having training data with positive and/or negative examples of training content for the first stage. The first stage is configured to receive speech content, and to analyze the speech content to categorize the speech content as having first-stage positive speech content and/or first-stage negative speech content. The system includes a second stage configured to receive at least a portion, but less than all, of the first-stage negative speech content. The second stage is further configured to analyze the first-stage positive speech content to categorize the first-stage positive speech content as having second-stage positive speech content and/or second-stage negative speech content. The second stage is further configured to update the database using the second-stage positive speech content and/or the second-stage negative speech content.

Among other things, the second stage is configured to analyze the received first-stage negative speech content to categorize the first-stage negative speech content as having second-stage positive speech content and/or second-stage negative speech content. Furthermore, the second stage is configured to update the database using the second-stage positive speech content and/or the second-stage negative speech content.

In accordance with yet another embodiment, a method trains a multi-stage content analysis system. The method provides a multi-stage content analysis system. The system has a first stage and a second stage. The system trains the first stage using a database having training data with positive and/or negative examples of training content for the first stage. The method receives speech content. The speech content is analyzed using the first stage to categorize the speech content as having first-stage positive speech content and/or first-stage negative speech content. The first-stage positive speech content is analyzed using the second stage to categorize the first-stage positive speech content as having second-stage positive speech content and/or second-stage negative speech content. The method updates the database using the second-stage positive speech content and/or the second-stage negative speech content. The method also discards at least a portion of the first-stage negative speech content.

The method may further analyze less than all of the first-stage negative speech content using the second stage to categorize the first-stage negative speech content as having second-stage positive speech content and/or second-stage negative speech content. The method may further update the database using the second-stage positive speech content and/or the second-stage negative speech content.

Among other things the method may use a database having training data with positive and/or negative examples of training content for the first stage. The method produces first-stage positive determinations ("S1-positive determinations") associated with a portion of the speech content, and/or first-stage negative determinations ("S1-negative determinations"). The speech associated with the S1-positive determinations is analyzed. Among other things, the positive and/or negative examples relate to particular categories of toxicity.

In accordance with another embodiment, a moderation system for managing content includes a plurality of successive stages arranged in series. Each stage is configured to receive input content and filter the input content to produce filtered content. A plurality of the stages are each configured to forward the filtered content toward a successive stage. The system includes training logic operatively coupled with the stages. The training logic is configured to use information relating to processing by a given subsequent stage to train processing of an earlier stage, the given subsequent stage receiving content derived directly from the earlier stage or from at least one stage between the given subsequent stage and the earlier stage.

The content may be speech content. The filtered content of each stage may include a subset of the received input content. Each stage may be configured to produce filtered content from input content to forward to a less efficient stage, a given less efficient stage being more powerful than a second more Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 2 schematically shows details of the content moderation system in accordance with illustrative embodiments of the invention.

Figure 1A:
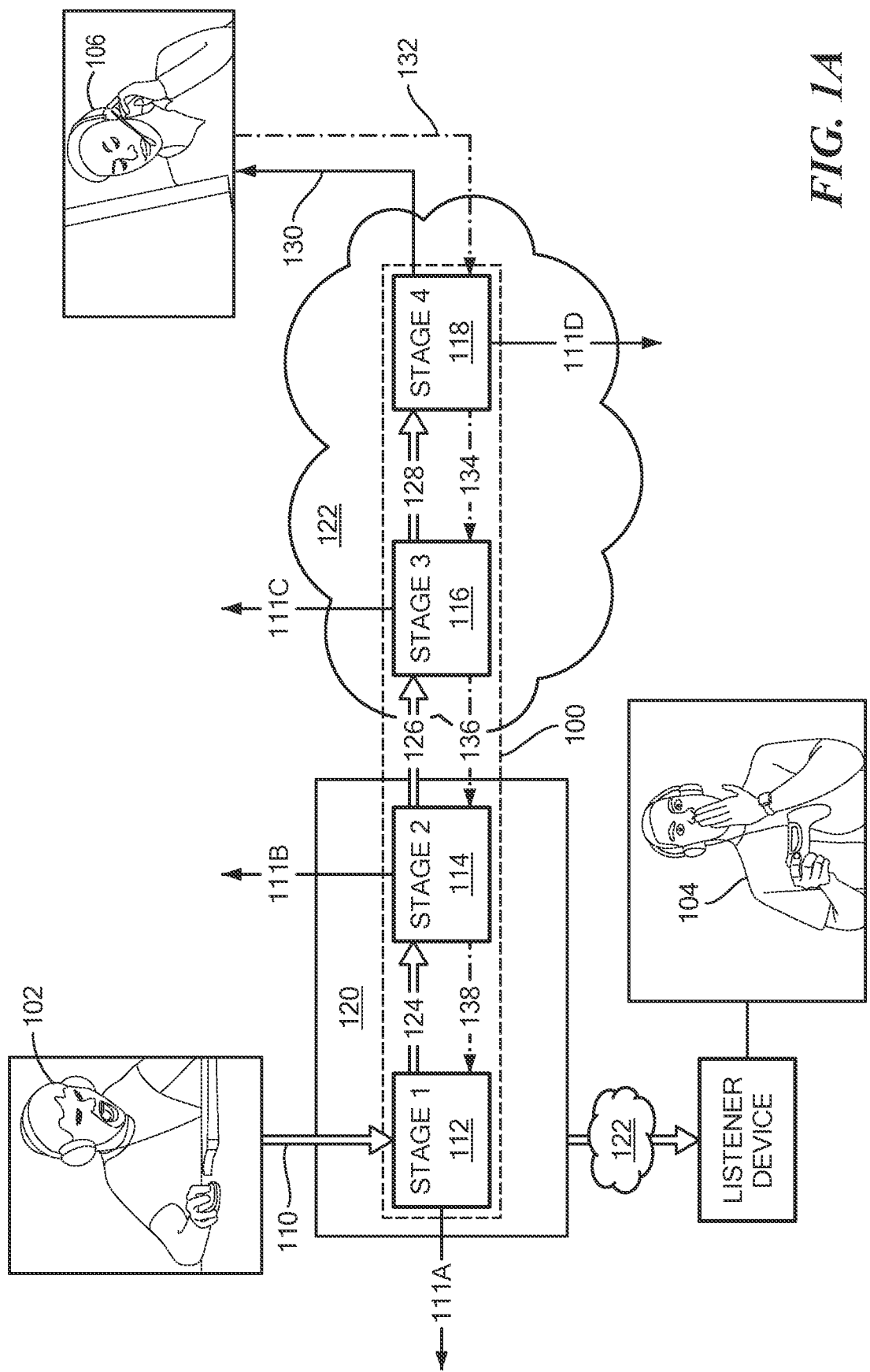
FIG. 1A schematically shows a system for content moderation in accordance with illustrative embodiments of the invention.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

In illustrative embodiments, a content moderation system analyzes speech, or characteristics thereof, and determines the likelihood that the speech is toxic. The system uses a multi-stage analysis to increase cost-efficiency and reduce compute requirements. A series of stages communicate with one another. Each stage filters out speech that is non-toxic, and passes along potentially toxic speech, or data representative thereof, to a subsequent stage. The subsequent stage uses analytical techniques that are more reliable (e.g., computationally burdensome) than the previous stage. Accordingly, a multi-staged system may filter speech that is most likely to be toxic to stages that are more reliable and computationally burdensome. The results of the subsequent stage may be used to retrain the previous stage. Illustrative embodiments therefore provide triage on the input speech, filtering out non-toxic speech so that later, more complicated stages need not operate on as much input speech.

Furthermore, in various embodiments, the stages are adaptive, taking feedback on correct or incorrect filtering decisions from later stages or external judgements and updating their filtering process as more data passes through the system, in order to better separate out probable toxic speech from probable non-toxic speech. This tuning may happen automatically or be manually through triggered; continuously or periodically (often training on batches of feedback at a time).

For the sake of clarity, various embodiments may refer to user speech, or analysis thereof. Although the term "speech" is used, it should be understood that the system does not necessarily directly receive or "hear" the speech in real time, nor is the receipt in real time. When a particular stage receives "speech," that "speech" may include some or all of the previous "speech," and/or data representing that speech or portions thereof. The data representing the speech may be encoded in a variety of ways—it could be raw audio samples represented in ways such as Pulse Code Modulate (PCM), for example Linear Pulse Code Modulation or encoded via A-law or u-law quantization. The speech may also be in other forms than raw audio, such as represented in spectrograms, Mel-Frequency Cepstrum Coefficients, Cochleograms, or other representations of speech produced by signal processing. The speech may be filtered (such as bandpassed, or compressed). The speech data may be presented in additional forms of data derived from the speech, such frequency peaks and amplitudes, distributions over phonemes, or abstract vector representations produced by neural networks. The data could be uncompressed, or input in a variety of lossless formats (such as FLAC or WAVE) or lossy formats (such as MP3 or Opus); or in the case of other representations of the speech be input as image data (PNG, JPEG, etc.), or encoded in custom binary formats. Therefore, while the term "speech" is used, it should be understood that this is not limited to a human listenable audio file. Furthermore, some embodiments may use other types of media, such as images or videos.

Automated moderation occurs primarily in text-based media, such as social media posts or text chat in multiplayer video games. Its basic form typically includes a blacklist of banned words or phrases that are matched against the text content of the media. If a match is found, the matching words may be censored, or the writer disciplined. The systems may employ fuzzy matching techniques to circumvent simple evasion techniques, e.g., users replacing letters with similarly-shaped numbers, or omitting vowels. While scalable and cost efficient, traditional automated moderation is generally considered relatively easy to bypass with minimal creativity, is insufficiently sophisticated to detect disruptive behavior beyond the use of simple keywords or short phrases, and is difficult to adapt to new communities or platforms—or to adapt to the evolving terminology and communication styles of existing communities. Some examples of traditional automated moderation exist in moderating illegal videos and images, or illegal uses of copyrighted material. In these cases, the media often is hashed to provide a compact representation of its content, creating a blacklist of hashes; new content is then hashed and checked against the blacklist.

Manual moderation, by contrast, generally employs teams of humans who consume a portion of the content communicated on the platform, and then decide whether the content is in violation of the platform's policies. The teams typically can only supervise several orders of magnitude less content than is communicated on the platform. Therefore, a selection mechanism is employed to determine what content the teams should examine. Typically this is done through user reports, where users consuming content can flag other users for participating in disruptive behavior. The content communicated between the users is put into a queue to be examined by the human moderators, who make a judgment based on the context of the communication and apply punitive action.

Manual moderation presents additional problems. Humans are expensive to employ and the moderation teams are small, so only a small fraction of the platform content is manually determined to be safe to consume, forcing the platform to permit most content unmoderated by default. Queues for reported content are easily overwhelmed, especially via hostile action—coordinated users can either all participate in disruptive behavior simultaneously, overloading the moderation teams; or said users can all report benign content, rendering the selection process ineffective. Human moderation is also time consuming—the human must receive the content, understand it, then react—rendering low-latency actions such as censoring impossible on high-content-volume platforms; a problem which is extended by selection queues which can saturate, delaying content while the queues are handled. Moderation also takes a toll on the human teams—members of the teams are directly exposed to large quantities of offensive content and may be emotionally affected by it; and the high cost of maintaining such teams can lead to team members working long hours and having little access to resources to help them cope.

Current content moderation systems known to the inventors are either too simple to effectively prevent disruptive behavior or too expensive to scale to large amounts of content. These systems are slow to adapt to changing environments or new platforms. Sophisticated systems, beyond being expensive, typically have large latencies between content being communicated and being moderated, rendering real-time reaction or censoring highly difficult at scale.

Illustrative embodiments implement an improved moderation platform as a series of multiple adaptive triage stages, each of which filter out content, from its series stages, which can be determined as non-disruptive with high confidence, passing content that cannot be filtered out to a later stage. By receiving information on which filtered content was or was not deemed disruptive by later stages, stages can update themselves to perform filtering more effectively on future content. Chaining together several of these stages in sequence triages the content down to a manageable level able to be processed by human teams or further autonomous systems: with each stage filtering out a portion of the incoming content, the pipeline achieves a decrease (e.g., exponential) in the amount of content to be moderated by future stages.

FIG. 1A schematically shows a system 100 for content moderation in accordance with illustrative embodiments of the invention. The system 100 described with reference to FIG. 1A moderates voice content, but those of skill in the art will understand that various embodiments may be modified to moderate other types of content (e.g., media, text, etc.) in a similar manner. Additionally, or alternatively, the system 100 may assist a human moderator 106 in identifying speech 110 that is most likely to be toxic. The system 100 has applications in a variety of settings, but in particular, may be useful in video games. Global revenue for the video game industry is thriving, with an expected 20% annual increase in 2020. The expected increase is due in part to the addition of new gamers (i.e., users) to video games, which increasingly offer voice chat as an in-game option. Many other voice chat options exist outside of gaming as well. While voice chat is a desirable feature in many online platforms and video games, user safety is an important consideration. The prevalence of online toxicity via harassment, racism, sexism, and other types of toxicity are detrimental to the users' online experience, and may lead to decline in voice chat usage and/or safety concerns. Thus, there is a need for a system 100 that can efficiently (i.e., cost and time) determine toxic content (e.g., racism, sexism, other bullying) from a large pool of content (e.g., all voice chat communications in a video game)

To that end, the system 100 interfaces between a number of users, such as a speaker 102, a listener 104, and a moderator 106. The speaker 102, the listener 104, and the moderator 106 may be communicating over a network 122 provided by a given platform, such as Fortnite, Call of Duty, Roblox, Halo; streaming platforms such as YouTube and Twitch, and other social apps such as Discord, WhatsApp, Clubhouse, dating platforms, etc.

For ease of discussion, FIG. 1A shows speech 110 flowing in a single direction (i.e., towards the listener 104 and the moderator 106). In practice, the listener 104 and/or the moderator 106 may be in bi-directional communication (i.e., the listener 104 and/or the moderator 106 may also be speaking with the speaker 102). For the sake of describing the operation of the system 100, however, a single speaker 102 is used as an example. Furthermore, there may be multiple listeners 104, some or all of which may also be speakers 102 (e.g., in the context of a video game voice chat, where all participants are both speakers 102 and listeners 104). In various embodiments, the system 100 operates in a similar manner with each speaker 102.

Additionally, information from other speakers may be combined and used when judging the toxicity of speech from a given speaker—for example, one participant (A) might insult another (B), and B might defend themself using vulgar language. The system could determine that B is not being toxic, because their language is used in self-defense, while A is. Alternatively, the system 100 may determine that both are being toxic. This information is consumed by inputting it into one or more of the stages of the system— typically later stages that do more complex processing, but it could be any or all stages.

The system 100 includes a plurality of stages 112-118 each configured to determine whether the speech 110, or a representation thereof, is likely to be considered toxic (e.g., in accordance with a company policy that defines "toxicity"). In various embodiments, the stage is a logical or abstract entity defined by its interface: it has an input (some speech) and two outputs (filtered speech and discarded speech) (however, it may or may not have additional inputs—such as session context, or additional outputs—such as speaker age estimates), and it receives feedback from later stages (and may also provide feedback to earlier stages). These stages are, of course, physically implemented—so they're typically software/code (individual programs, implementing logic such as Digital Signal Processing, Neural Networks, etc.—or combinations of these), running on hardware such as general purposes computers (CPU, or GPU). However, they could be implemented as FPGAs, ASICs, analog circuits, etc. etc. Typically, the stage has one or more algorithms, running on the same or adjacent hardware. For example, one stage may be a keyword detector running on the speaker's computer. Another stage may be a transcription engine running on a GPU, followed by some transcription interpretation logic running on a CPU in the same computer. Or a stage may be multiple neural networks whose outputs are combined at the end to do the filtering, which run on different computers but in the same cloud (such as AWS).

FIG. 1A shows four stages 112-118. However, it should be understood that fewer or more stages may be used. Some embodiments may have only a single stage 112, however, preferred embodiments have more than one stage for efficiency purposes, as discussed below. Furthermore, the stages 112-118 may be entirely on a user device 120, on a cloud server 122, and/or distributed across the user device 120 and the cloud 122, as shown in FIG. 1A. In various embodiments, the stages 112-118 may be on servers of the platform 122 (e.g., the gaming network 122).

The first stage 112, which may be on a speaker device 120, receives the speech 110. The speaker device 120 may be, for example, a mobile phone (e.g., an iPhone), a video game system (e.g., a PlayStation, Xbox), and/or a computer (e.g., a laptop or desktop computer), among other things. The speaker device 120 may have an integrated microphone (e.g., microphone in the iPhone), or may be coupled to a microphone (e.g., headset having a USB or AUX microphone). The listener device may be the same or similar to the speaker device 120. Providing one or more stages on the speaker device 120 allows the processing implementing the one or more stages to occur on hardware that the speaker 102 owns. Typically, this means that the software implementing the stage is running on the speaker's 102 hardware (CPU or GPU), although in some embodiments the speaker 102 may have a dedicated hardware unit (such as a dongle) which attaches to their device. In some embodiments, one or more stages may be on the listener device.

As will be described in further detail below, the first stage 112 receives a large amount of the speech 110. For example, the first stage 112 may be configured to receive all of the speech 110 made by the speaker 102 that is received by the device 120 (e.g., a continuous stream during a phone call). Alternatively, the first stage 112 may be configured to receive the speech 110 when certain triggers are met (e.g., a video game application is active, and/or a user presses a chat button, etc.). As a use case scenario, the speech 110 may be speech intended to be received by the listener 104, such as a team voice communication in a video game The first stage 112 is trained to determine whether any of the speech 110 has a likelihood of being toxic (i.e., contains toxic speech). In illustrative embodiments, the first stage 112 analyzes the speech 110 using an efficient method (i.e., computationally efficient method and/or low-cost method), as compared to subsequent stages. While the efficient method used by the first stage 112 may not be as accurate in detecting toxic speech as subsequent stages (e.g., stages 114-118), the first stage 112 generally receives more speech 110 that the subsequent stages 114-118.

If the first stage 112 does not detect a likelihood of toxic speech, then the speech 110 is discarded (shown as discarded speech 111). However, if the first stage 112 determines that there is a likelihood that some of the speech 110 is toxic, some subset of the speech 110 is sent to a subsequent stage (e.g., the second stage 114). In FIG. 1A, the subset that is forwarded/uploaded is the filtered speech 124, which includes at least some portion of the speech 110 that is considered to have a likelihood of including toxic speech. In illustrative embodiments, the filtered speech 124 preferably is a subset of the speech 110, and is therefore, represented by a smaller arrow. However, in some other embodiments, the first stage 112 may forward all of the speech 110.

Furthermore, when describing the speech 110, it should be made clear that the speech 110 may refer to a particular analytical chunk. For example, the first stage 112 may receive 60-seconds of speech 110, and the first stage 112 may be configured to analyze the speech in 20-second intervals. Accordingly, there are three 20-second speech 110 chunks that are analyzed. Each speech chunk may be independently analyzed. For example, the first 20-second chunk may not have a likelihood of being toxic and may be discarded. The second 20-second chunk may meet a threshold likelihood of being toxic, and therefore, may be forwarded to the subsequent stage. The third 20-second chunk may not have a likelihood of being toxic, and again, may be discarded. Thus, reference to discarding and/or forwarding the speech 110 relates to a particular speech 110 segment that is analyzed by the given stage 112-118, as opposed to a universal decision for all of the speech 110 from the speaker 102.

The filtered speech 124 is received by the second stage 114. The second stage 114 is trained to determine whether any of the speech 110 has a likelihood of being toxic. However, the second stage 114 generally uses a different method of analysis from the first stage 112. In illustrative embodiments, the second stage 114 analyses the filtered speech 124 using a method that is more computationally taxing than the previous stage 112. Thus, the second stage 114 may be considered to be less efficient than the first stage 112 (i.e., less computationally efficient method and/or more-expensive method as compared to the prior stage 112). However, the second stage 114 is more likely to be accurate in detecting toxic speech 110 accurately as compared to the first stage 112. Furthermore, although the subsequent stage 114 may be less efficient than the earlier stage 112, that does not necessarily imply that the second stage 114 takes longer to analyze the filter speech 124 than the first stage 112 takes to analyze the initial speech 110. This is in part because the filtered speech 124 is a sub-segment of the initial speech 110.

Similar to the process described above with reference to the first stage 112, the second stage 114 analyzes the filtered speech 124 and determines whether the filtered speech 124 has a likelihood of being toxic. If not, then the filtered speech 124 is discarded. If there is a likelihood of being toxic (e.g., the probability is determined to be above a given toxicity likelihood threshold), then filtered speech 126 is passed on to the third stage 116. It should be understood that the filtered speech 126 may be the entirety, a chunk 110A, and/or a sub-segment of the filtered speech 124. However, the filtered speech 126 is represented by a smaller arrow than the filtered speech 124, because in general, some of the filtered speech 124 is discarded by the second stage 114, and therefore, less filtered speech 126 passes to the subsequent third stage 116.

This process of analyzing speech with subsequent stages that use more computational taxing analytical methods may be repeated for as many stages as desirable. In FIG. 1A, the process is repeated at the third stage 116 and at the fourth stage 118. Similar to the previous stages, the third stage 116 filters out speech unlikely to be toxic, and passes on filtered speech 128 that is likely to be toxic to the fourth stage 118. The fourth stage 118 uses an analytical method to determine whether the filtered speech 128 contains toxic speech 130. The fourth stage 118 may discard unlikely to be toxic speech, or pass on likely to be toxic speech 130. The process may end at the fourth stage 118 (or other stage, depending on the number of desired stages).

The system 100 may make an automated decision regarding speech toxicity after the final stage 118 (i.e., whether the speech is toxic or not, and what action, if necessary, is appropriate). However, in other embodiments, and shown in FIG. 1A, the final stage 118 (i.e., the least computational efficient, but most accurate stage) may provide what it believes to be toxic speech 130 to the human moderator 106. The human moderator may listen to the toxic speech 130 and make a determination of whether the speech 130 determined to be toxic by the system 100 is in fact toxic speech (e.g., in accordance with a company policy on toxic speech).

In some embodiments, one or more non-final stage 112-116 may determine that speech "is definitely toxic" (e.g., has 100% confidence that speech is toxic) and may make a decision to bypass subsequent and/or the final stage 118 altogether (e.g., by forwarding the speech on to a human moderator or other system). In addition, the final stage 118 may provide what it believes to be toxic speech to an external processing system, which itself makes a decision on whether the speech is toxic (so it acts like a human moderator, but may be automatic). For example, some platforms may have reputation systems configured to receive the toxic speech and process it further automatically using the speaker 102 (e.g., video game player) history.

The moderator 106 makes the determination regarding whether the toxic speech 130 is, or is not, toxic, and provides moderator feedback 132 back to the fourth stage 118. The feedback 132 may be received directly by the fourth stage 118 and/or by a database containing training data for the fourth stage 118, which is then used to train the fourth stage 118. The feedback may thus instruct the final stage 118 regarding whether it has correctly or incorrectly determined toxic speech 130 (i.e., whether a true positive or false positive determination was made). Accordingly, the final stage 118 may be trained to improve its accuracy over time using the human moderator feedback 132. In general, the human moderator 106 resources (i.e., man hours) available to review toxic speech is considerably less than the throughput handled by the various stages 112-118. By filtering the initial speech 110 through the series of stages 112-118, the human moderator 106 sees a small fraction of the initial speech 110, and furthermore, advantageously receives speech 110 that is most likely to be toxic. As an additional advantage, the human moderator feedback 132 is used to train the final stage 118 to more accurately determine toxic speech.

Each stage may process the entirety of the information in a filtered speech clip, or it may process only a portion of the information in that clip. For example, in order to be computationally efficient, the stage 112-118 may process only a small window of the speech looking for individual words or phrases, needing only a small amount of context (e.g., 4-seconds of the speech instead of a full 15-second clip, etc.). The stage 112-118 may also use additional information from previous stages (such as a computation of perceptual loudness over the duration of the clip) to determine which areas of the speech 110 clip could contain speech or not, and therefore dynamically determine which parts of the speech 110 clip to process.

Similarly, a subsequent stage (e.g., the fourth stage 118) may provide feedback 134-138 to a previous stage (e.g., the third stage 116) regarding whether the previous stage accurately determined speech to be toxic. Although the term "accurately" is used, it should understood by those of skill in the art that accuracy here relates to the probability of speech being toxic as determined by the stage, not necessarily a true accuracy. Of course, the system is configured to train to become more and more truly accurate in accordance with the toxicity policy. Thus, the fourth stage 118 may train the third stage 116, the third stage 116 may train the second stage 114, and the second stage 112, may train the first stage 112. As described previously, the feedback 132-138 may be directly received by the previous stage 112-118, or it may be provided to the training database used to train the respective stage 112-118.

Figure 1B:
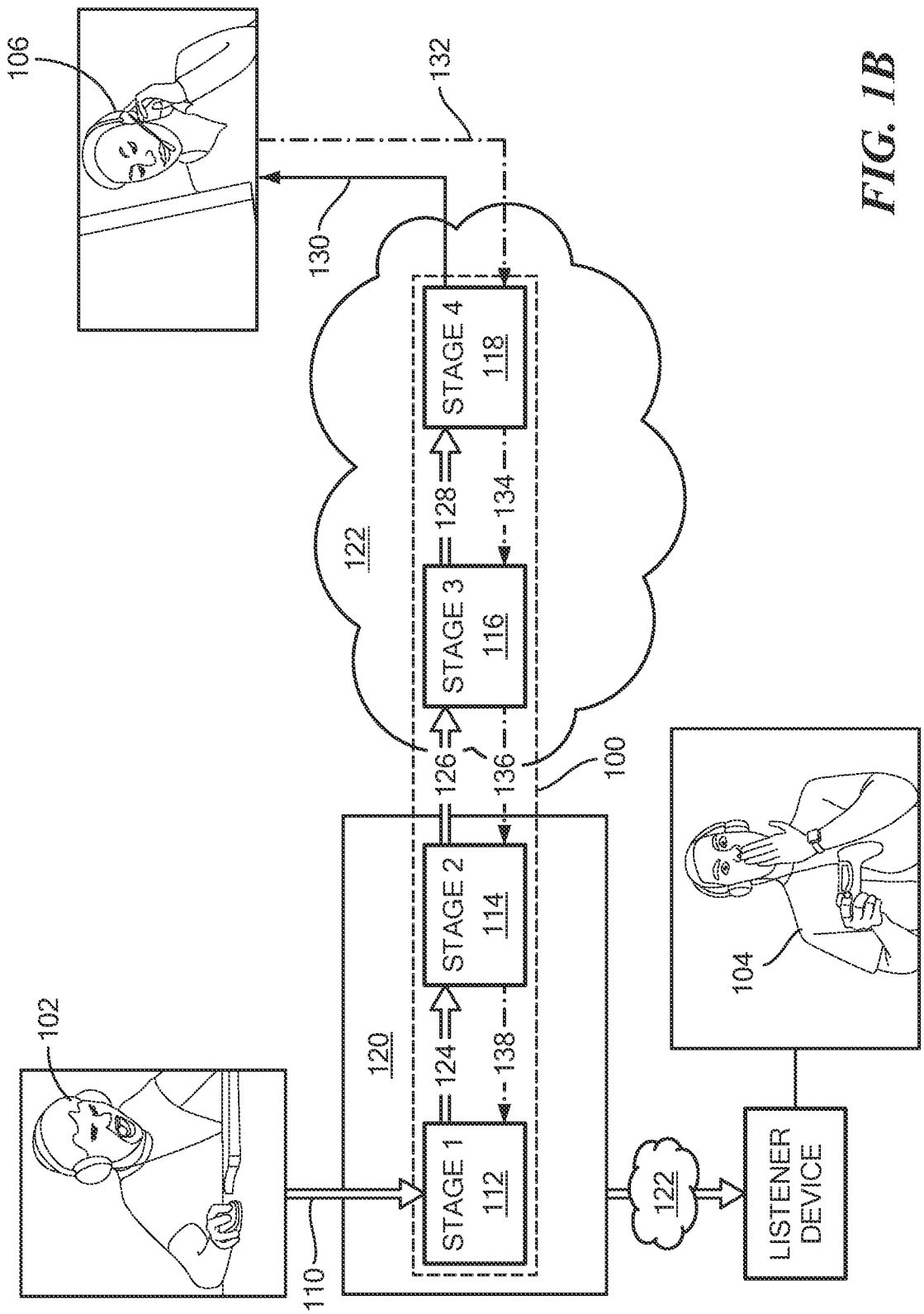
FIGS. 1B-1C schematically show alternative configurations of the system for content moderation of FIG. 1A.
Figure 1C:
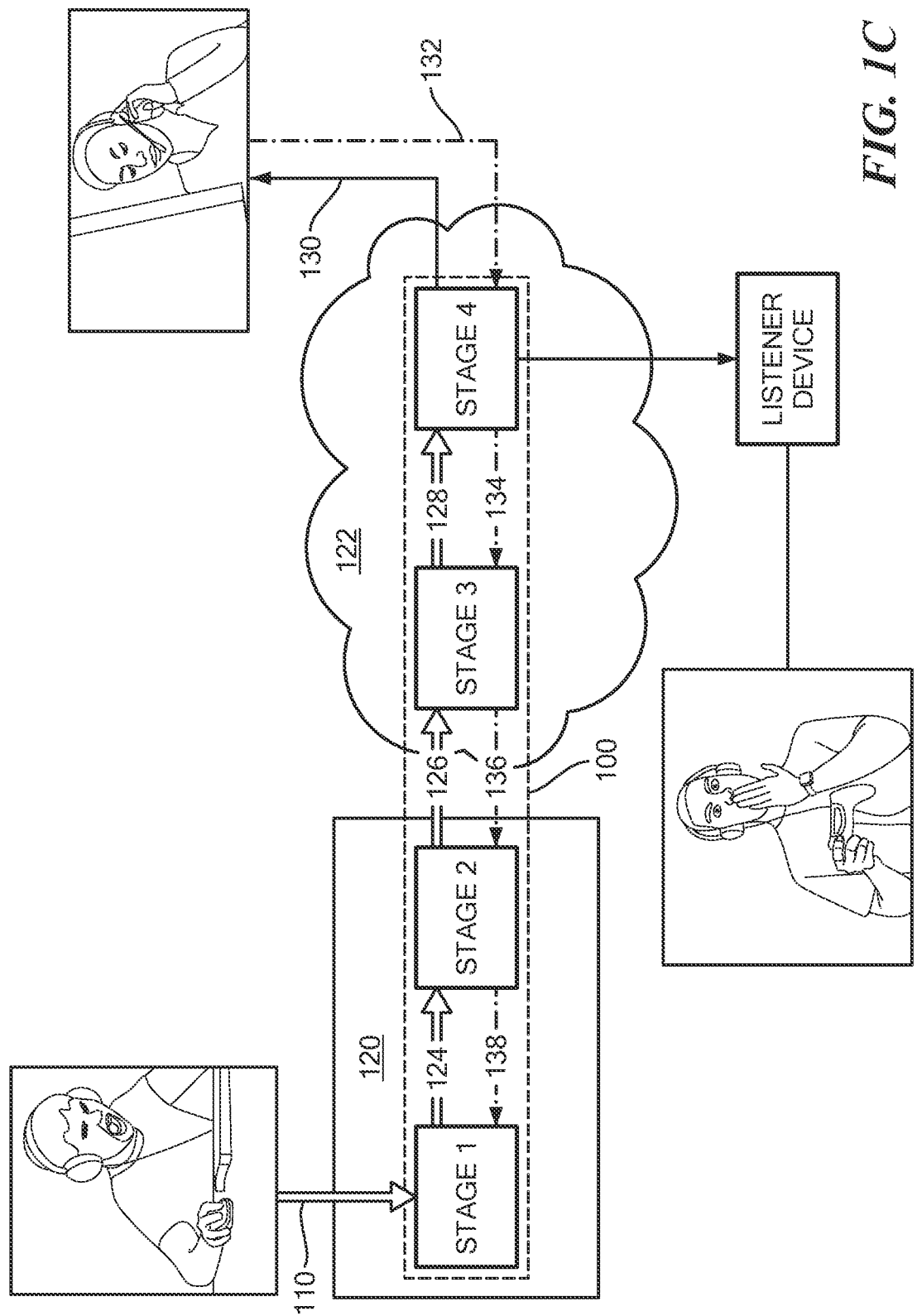

FIGS. 1B-1C schematically show the system 100 for content moderation in alternative configurations in accordance with illustrative embodiments of the invention. As shown and described, the various stages 112-118 may be on the speaker device 120 and/or on the platform servers 122. However, in some embodiments, the system 100 may be configured such that the user speech 110 reaches the listener 104 without passing through the system 100, or only by passing through one or more stages 112-114 on the user device 120 (e.g., as shown in FIG. 1B). However, in some other embodiments, the system 100 may be configured such that the user speech 110 reaches the listener 104 after passing through the various stages 112-118 of the system 100 (as shown in FIG. 1C).

The inventors suspect that the configuration shown in FIG. 1B may result in increased latency times for receiving the speech 110. However, by passing through the stages 112-114 on the user device 120, it may be possible to take corrective action and moderate content prior to it reaching the intended recipient (e.g., listener 104). This is also true with the configuration shown in FIG. 1C, which would result in further increased latency times, particularly given that the speech information passes through cloud servers before reaching the listener 104.

FIG. 2 schematically shows details of the voice moderation system 100 in accordance with illustrative embodiments of the invention. The system 100 has an input 208 configured to receive the speech 110 (e.g., as an audio file) from the speaker 102 and/or the speaker device 120. It should be understood that reference to the speech 110 includes audio files, but also other digital representations of the speech 110. The input includes a temporal receptive field 209 configured to break the speech 110 into speech chunks. In various embodiments, a machine learning 215 determines whether the entire speech 110 and/or the speech chunks contain toxic speech.

The system also has a stage converter 214, configured to receive the speech 110 and convert the speech in a meaningful way that is interpretable by the stage 112-118. Furthermore, the stage converter 214 allows communication between stages 112-118 by converting filtered speech 124, 126, 128 in such a way that the respective stages 114, 116, and 118 are able to receive to the filtered speech 124, 126, or 128 and analyze the speech.

The system 100 has a user interface server 210 configured to provide a user interface through which the moderator 106 may communicate with the system 100. In various embodiments, the moderator 106 is able to listen to (or read a transcript of) the speech 130 determined to be toxic by the system 100. Furthermore, 106 the moderator may provide feedback through the user interface regarding whether the toxic speech 130 is in fact toxic or not. The moderator 106 may access the user interface via an electronic device (such as a computer, smartphone, etc.), and use the electronic device to provide the feedback to the final stage 118. In some embodiments, the electronic device may be a networked device, such as an internet-connected smartphone or desktop computer.

The input 208 is also configured to receive the speaker 102 voice and map the speaker 102 voice in a database of voices 212, also referred to as a timbre vector space 212. In various embodiments, the timbre vector space 212 may also include a voice mapping system 212. The timbre vector space 212 and voice mapping system 212 were previously invented by the present inventors and described, among other places, in U.S. Pat. No. 10,861,476, which is incorporated herein by reference in its entirety. The timbre vector space 212 is a multi-dimensional discrete or continuous vector space that represents encoded voice data. The representation is referred to as "mapping" the voices. When the encoded voice data is mapped, the vector space 212 makes characterizations about the voices and places them relative to one another on that basis. For example, part of the representation may have to do with pitch of the voice, or gender of the speaker. The timbre vector space 212 maps voices relative to one another, such that mathematical operations may be performed on the voice encoding, and also that qualitative and/or quantitative information may be obtained from the voice (e.g., identity, sex, race, age, of the speaker 102). It should be understood however that various embodiments do not require the entire timbre mapping component/the timbre vector space 112. Instead, information may be extracted, such as sex/race/age/etc. independently via a separate neural network or other system.

The system 100 also includes a toxicity machine learning 215 configured to determine a likelihood (i.e., a confidence interval), for each stage, that the speech 110 contains toxicity. The toxicity machine learning 215 operates for each stage 112-118. For example, the toxicity machine learning 215 may determine, for a given amount of speech 110, that there is a 60% confidence of toxic speech at the first stage 112, and that there is a 30% confidence of toxic speech at the second stage 114. Illustrative embodiments may include separate toxicity machine learning 215 for each of the stages 112-118. However, for the sake of convenience, various components of the toxicity machine learning 215 that may be distributed throughout various stages 112-118 are shown as being within a single toxicity machine learning component 215. In various embodiments, the toxicity machine learning 215 may be one or more neural networks.

The toxicity machine learning 215 for each stage 112-118 is trained to detect toxic speech 110. To that end, the machine learning 215 communicates with a training database 216 having relevant training data therein. The training data in the database 216 may include a library of speech that has been classified by a trained human operator as being toxic and/or not toxic.

The toxicity machine learning 215 has a speech segmenter 234 234 configured to segment the received speech 110 and/or chunks 110A into segments, which are then analyzed. These segments are referred to as analytical segments and are considered to be part of the speech 110. For example, the speaker 102 may provide a total of 1 minute of speech 110. The segmenter 234 may segment the speech 110 into three 20-second intervals, each of which are analyzed independently by the stages 112-118. Furthermore, the segmenter 234 may be configured to segment the speech 110 into different length segments for different stages 112-118 (e.g., two 30-second segments for the first stage, three 20-second segments for the second stage, four 15-second segments for the third stage, five 10-second segments for the fifth stage). Furthermore, the segmenter 234 may segment the speech 110 into overlapping intervals. For example, a 30-second segment of the speech 110 may be segmented into five segments (e.g., 0-seconds to 10-seconds, 5-seconds to 15-seconds, 10-seconds to 20-seconds, 15-seconds to 25-seconds, 20-seconds to 30-seconds).

In some embodiments, the segmenter 234 may segment later stages into longer segments than earlier stages. For example, a subsequent stage 112 may want to combine previous clips to get broader context. The segmenter 234 may accumulate multiple clips to gain additional context and then pass the entire clip through. This could be dynamic as well—for example, accumulate speech in a clip until a region of silence (say, 2-seconds or more), and then pass on that accumulated clip all at once. In that case, even though the clips were input as separate, individual clips, the system would treat the accumulated clip as a single clip from then on (so make one decision on filtering or discarding the speech, for example).

The machine learning 215 may include an uploader 218 (which may be a random uploader) configured to upload or pass through a small percentage of discarded speech 111 from each stage 112-118. The random uploader module 218 is thus configured to assist with determining a false negative rate. In other words, if the first stage 112 discards speech 111A, a small portion of that speech 111A is taken by the random uploader module 218 and sent to the second stage 114 for analysis. The second stage 114 can therefore determine if the discarded speech 111A was in fact correctly or incorrectly identified as non-toxic (i.e., a false negative, or a true negative for likely to be toxic). This process can be repeated for each stage (e.g., discarded speech 111B is analyzed by the third stage 116, discarded speech 111C is analyzed by the fourth stage, and discarded speech 111D is analyzed by the moderator 106).

Various embodiments aim to be efficient by minimizing the amount of speech uploaded/analyzed by higher stages 114-118 or the moderator 106. However, various embodiments sample only a small percentage of discarded speech 111, such as less than 1% of discarded speech, or preferably, less than 0.1% of discarded speech 111. The inventors believe that this small sample rate of discarded speech 111 advantageously trains the system 100 to reduce false negatives without overburdening the system 100. Accordingly, the system 100 efficiently checks for the status of false negatives (by minimizing the amount of information that is checked), and to improve the false negative rate over time. This is significant, as it is advantageous to correctly identify speech that is toxic, but also not to misidentify speech that is toxic.

A toxicity threshold setter 230 is configured to set a threshold for toxicity likelihood for each stage 112-118. As described previously, each stage 112-118 is configured to determine/output a confidence of toxicity. That confidence is used to determine whether the speech 110 segment should be discarded 111, or filtered and passed on to a subsequent stage. In various embodiments, the confidence is compared to a threshold that is adjustable by the toxicity threshold setter 230. The toxicity threshold setter 230 may be adjusted automatically by training with a neural network over time to increase the threshold as false negatives and/or false positives decrease. Alternatively, or additionally, the toxicity threshold setter 230 may be adjusted by the moderator 106 via the user interface 210.

The machine learning 215 may also include a session context flagger 220. The session context flagger 220 is configured to communicate with the various stages 112-118 and to provide an indication (a session context flag) to one or more stages 112-118 that previous toxic speech was determined by another stage 112-118. In various embodiments, the previous indication may be session or time limited (e.g., toxic speech 130 determined by the final stage 118 within the last 15 minutes). In some embodiments, the session context flagger 220 may be configured to receive the flag only from subsequent stages or a particular stage (such as the final stage 118).

The machine learning 215 may also include an age analyzer 222 configured to determine an age of the speaker 102. The age analyzer 222 may be provided a training data set of various speakers paired to speaker ages. Accordingly, the age analyzer 222 may analyze the speech 110 to determine an approximate age of the speaker. The approximate age of the speaker 102 may be used to adjust the toxicity threshold for a particular stage by communicating with the toxicity threshold setter 230 (e.g., a teenager may lower the threshold because they are considered to be more likely to be toxic). Additionally, or alternatively, the speaker's 102 voice may be mapped in the voice timbre vector space 212, and their age may be approximated from there.

An emotion analyzer 224 may be configured to determine an emotional state of the speaker 102. The emotion analyzer 224 may be provided a training data set of various speakers paired to emotion. Accordingly, the emotion analyzer 224 may analyze the speech 110 to determine an emotion of the speaker. The emotion of the speaker 102 may be used to adjust the toxicity threshold for a particular stage by communicating with the toxicity threshold setter. For example, an angry speaker may lower the threshold because they are considered more likely to be toxic.

A user context analyzer 226 may be configured to determine a context in which the speaker 102 provides the speech 110. The context analyzer 226 may be provided access to a particular speaker's 102 account information (e.g., by the platform or video game where the speaker 102 is subscribed). This account information may include, among other things, the user's age, the user's geographic region, the user's friends list, history of recently interacted users, and other activity history. Furthermore, where applicable in the video game context, the user's game history, including gameplay time, length of game, time at beginning of game and end of game, as well as, where applicable, recent inter-user activities, such as deaths or kills (e.g., in a shooter game).

For example, the user's geographic region may be used to assist with language analysis, so as not to confuse benign language in one language that sounds like toxic speech in another language. Furthermore, the user context analyzer 226 may adjust the toxicity threshold by communicating with the threshold setter 230. For example, for speech 110 in a communication with someone on a user's friend's list, the threshold for toxicity may be increased (e.g., offensive speech may be said in a more joking manner to friends). As another example, a recent death in the video game, or a low overall team score may be used to adjust the threshold for toxicity downwardly (e.g., if the speaker 102 is losing the game, they may be more likely to be toxic). As yet a further example, the time of day of the speech 110 may be used to adjust the toxicity threshold (e.g., speech 110 at 3 AM may be more likely to be toxic than speech 110 at 5 PM, and therefore the threshold for toxic speech is reduced).

In various embodiments, the toxicity machine learning 215 may include a transcription engine 228. The transcription engine 228 is configured to transcribe speech 110 into text. The text may then be used by one or more stages 112-118 to analyze the speech 110, or it may be provided to the moderator 106.

A feedback module 232 receives feedback from each of the subsequent stages 114-118 and/or a moderator 106 regarding whether the filtered speech 124, 126, 128, and/or 130 was considered to be toxic or not. The feedback module 232 may provide that feedback to the prior stage 112-118 to update the training data for the prior stage 112-118 (e.g., directly, or by communicating with the training database 216). For example, the training data for the fourth stage 118 may include negative examples, such as an indication of the toxic speech 130 that was escalated to the human moderator 106 that was not deemed to be toxic. The training data for the fourth stage 118 may also include positive examples, such as an indication of the toxic speech 130 that was escalated to the human moderator 106 that was deemed to be toxic.

Each of the above components of the system 100 may be operate on a plurality of stages 112-118. Additionally, or alternatively, each of the stages 112-118 may have any or all of the components as dedicated components. For example, each stage 112-118 may have the stage converter 214, or the system 100 may have a single stage converter 214. Furthermore, the various machine learning components, such as the random uploader 218, or the transcription engine 228 may operate on one or more of the stages 112-118. For example, every stage 112-118 may use the random uploader 218, but only the final stage may use the transcription engine 228.

Each of the above components is operatively connected by any conventional interconnect mechanism. FIG. 2 simply shows a bus 50 communicating the components. Those skilled in the art should understand that this generalized representation can be modified to include other conventional direct or indirect connections. Accordingly, discussion of the bus 50 is not intended to limit various embodiments.

It should be noted that FIG. 2 only schematically shows each of these components. Those skilled in the art should understand that each of these components can be implemented in a variety of conventional manners, such as by using hardware, software, or a combination of hardware and software, across one or more other functional components. For example, transcription engine 228 may be implemented using a plurality of microprocessors executing firmware. As another example, speech segmenter 234 may be implemented using one or more application specific integrated circuits (i.e., "ASICs") and related software, or a combination of ASICs, discrete electronic components (e.g., transistors), and microprocessors. Accordingly, the representation of the segmenter 234, the transcription engine 228, and other components in a single box of FIG. 2 is for simplicity purposes only. In fact, in some embodiments, the speech segmenter 234 may be distributed across a plurality of different machines and/or servers—not necessarily within the same housing or chassis. Of course, the other components in machine learning 215 and the system 100 also can have implementations similar to those noted above for transcription engine 228.

Additionally, in some embodiments, components shown as separate (such as the age analyzer 222 and the user context analyzer 226) may be replaced by a single component (such as a user context analyzer 226 for the entire machine learning system 215). Furthermore, certain components and sub-components in FIG. 2 are optional. For example, some embodiments may not use the emotion analyzer 224. As another example, in some embodiments, the input 108 may not have a temporal receptive field 109.

It should be reiterated that the representation of FIG. 2 is a simplified representation. Those skilled in the art should understand that such a system likely has many other physical and functional components, such as central processing units, other packet processing modules, and short-term memory. Accordingly, this discussion is not intended to suggest that FIG. 2 represents all of the elements of various embodiments of the voice moderation system 100.

Figure 3A:
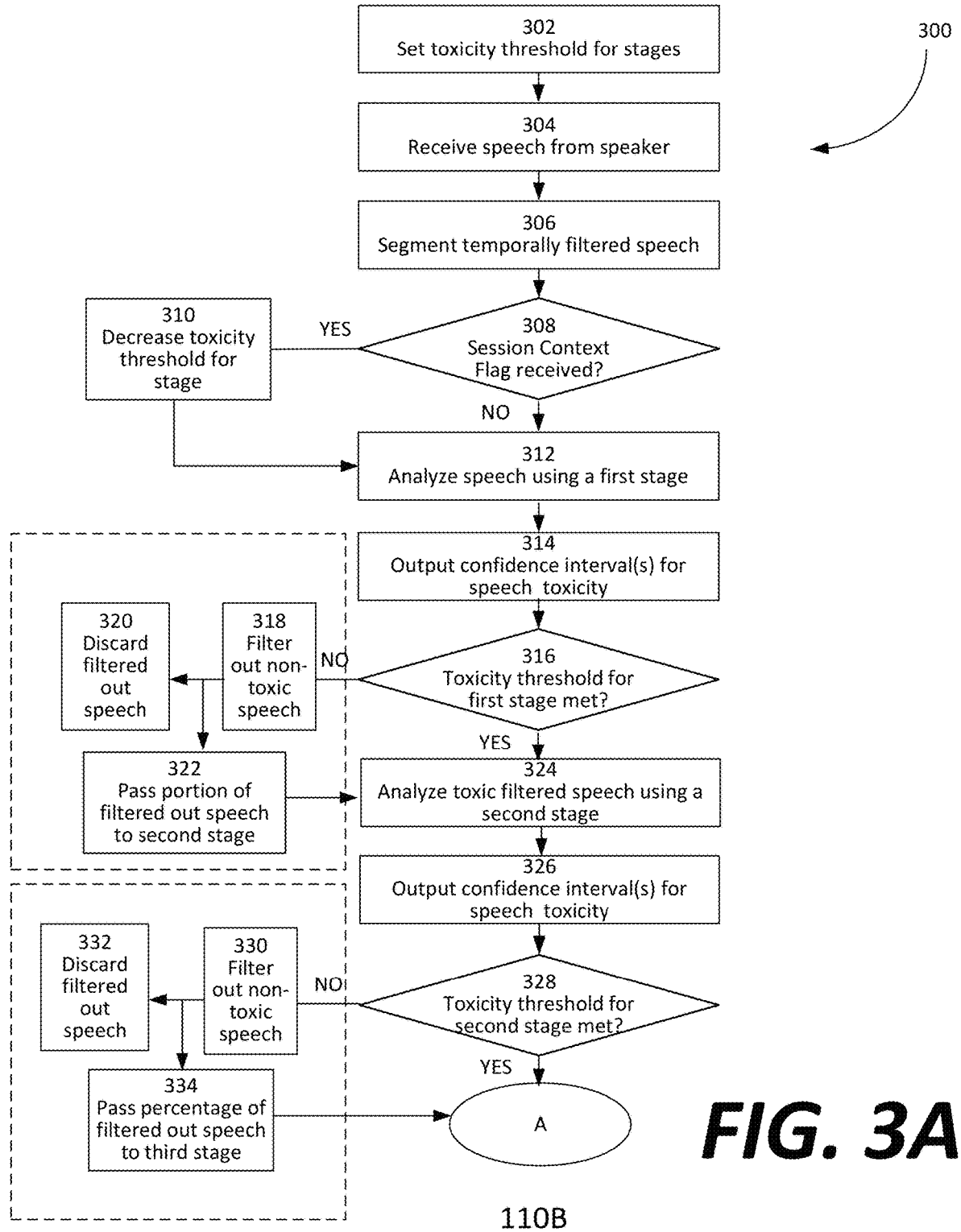
FIGS. 3A-3B show a process of determining whether speech is toxic in accordance with illustrative embodiments of the invention.
Figure 3B:
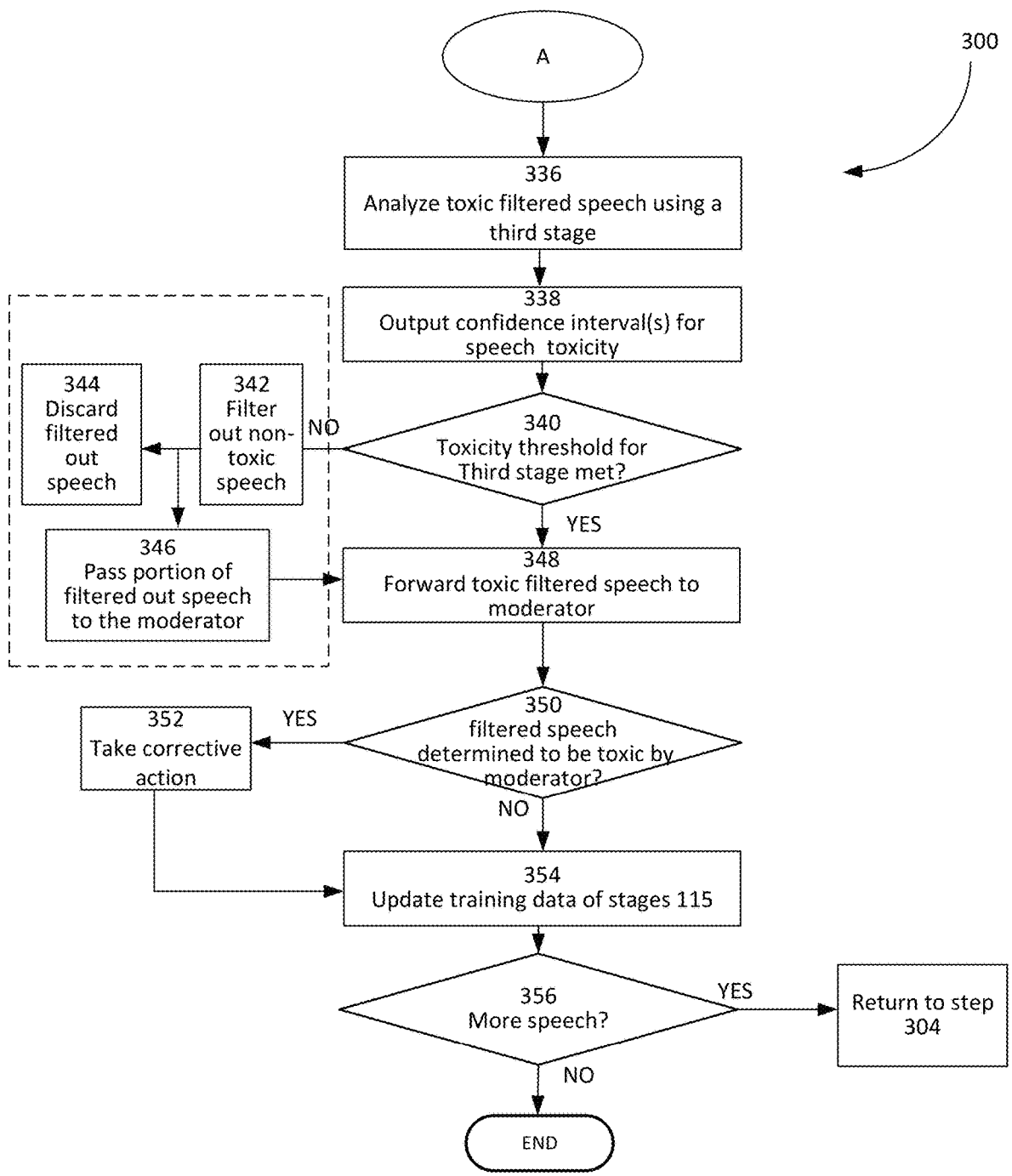

FIGS. 3A-3B show a process 300 of determining whether speech 110 is toxic in accordance with illustrative embodiments of the invention. It should be noted that this process is simplified from a longer process that normally would be used to determine whether speech 110 is toxic. Accordingly, the process of determining whether speech 110 is toxic likely has many steps that those skilled in the art likely would use. In addition, some of the steps may be performed in a different order than that shown or skipped altogether. Additionally, or alternatively, some of the steps may be performed at the same time. Those skilled in the art therefore can modify the process as appropriate.

Furthermore, discussion of specific example implementations of stages with reference to FIGS. 3A-3B are for the sake of discussion, and not intended to limit various embodiments. One of skill in the art understands that the training of the stages and the various components and interactions of the stages may be adjusted, removed, and/or added to, while still developing a working toxicity moderation system 100 in accordance with illustrative embodiments.

Because FIGS. 1A-1C showed four stages 112-118 as examples, each stage 112-118 was referred to with a separate reference numeral. However, when referring to any stage 115 going forward, one or more stages are referred to with a single reference numeral 115. It should be understood that reference to the stages 115 does not mean that the stages 115 are identical, or that the stages 115 are limited to any particular order or previously described stage 112-118 of the system 100, unless the context otherwise requires. The reference numeral for the stage 112 may be used to refer to an earlier or prior stage 112 of the system 100, and the reference numeral for the stage 118 may be used to refer to a subsequent or later stage 112 of the system 100, regardless of the number of actual stages (e.g., two stages, five stages, ten stages, etc.). Thus stages referred to as stage 115 are similar to or the same as stages 112-118, and vice-versa.

The process 300 begins at step 302 by setting the toxicity threshold for the stages 115 of the system 100. The toxicity threshold for each stage 115 of the system 100 may be set automatically by the system 100, by the moderator 106 (e.g., via the user interface), manually by the developers, a community manager, or by other third party. For example, the first stage 115 may have a toxicity threshold of 60% likely to be toxic for any given speech 110 that is analyzed. If the machine learning 215 of the first stage 115 determines that the speech 110 has a 60% or greater likelihood of being toxic, then the speech 110 is determined to be toxic and passed on or "filtered through" to the subsequent stage 115. A person of skill in the art understands that although the speech is referred to as being determined to be toxic speech by the stage 115, this does not necessarily imply that the speech is in fact toxic speech in accordance with a company policy, nor does it necessarily mean that subsequent stages 115 (if any) will agree that the speech is toxic. If the speech has less than a 60% likelihood of being toxic, then the speech 110 is discarded or "filtered out" and not sent to the subsequent stage 115. However, as described below, some embodiments may analyze some portion of the filtered-out speech 111 using the random uploader 218.

In the example described above, the toxicity threshold is described as being an inclusive range (i.e., 60% threshold is achieved by 60%). In some embodiments, the toxicity threshold may be an exclusive range (i.e., 60% threshold is achieved only by greater than 60% likelihood). Furthermore, in various embodiments, the threshold does not necessarily need to be presented as a percentage, but may be represented in some other format representing a likelihood of toxicity (e.g., a representation understandable by the neural network 215, but not by a human).

The second stage 115 may have its own toxicity threshold such that any speech analyzed by the second stage 115 that does not meet the threshold likelihood of being toxic is discarded. For example, the second stage may have a threshold of 80% or greater likelihood of being toxic. If the speech has a likelihood of being toxic that is greater than the toxicity threshold, the speech is forwarded to the subsequent third stage 115. Forwarding the speech 110 to the next stage may also be referred to as "uploading" the speech 110 (e.g., to a server through which the subsequent stage 115 may access the uploaded speech 110). If the speech does not meet the second stage 115 threshold, then it is discarded. This process of setting toxicity threshold may be repeated for each stage 115 of the system 100. Each stage may thus have its own toxicity threshold.

Figure 4:
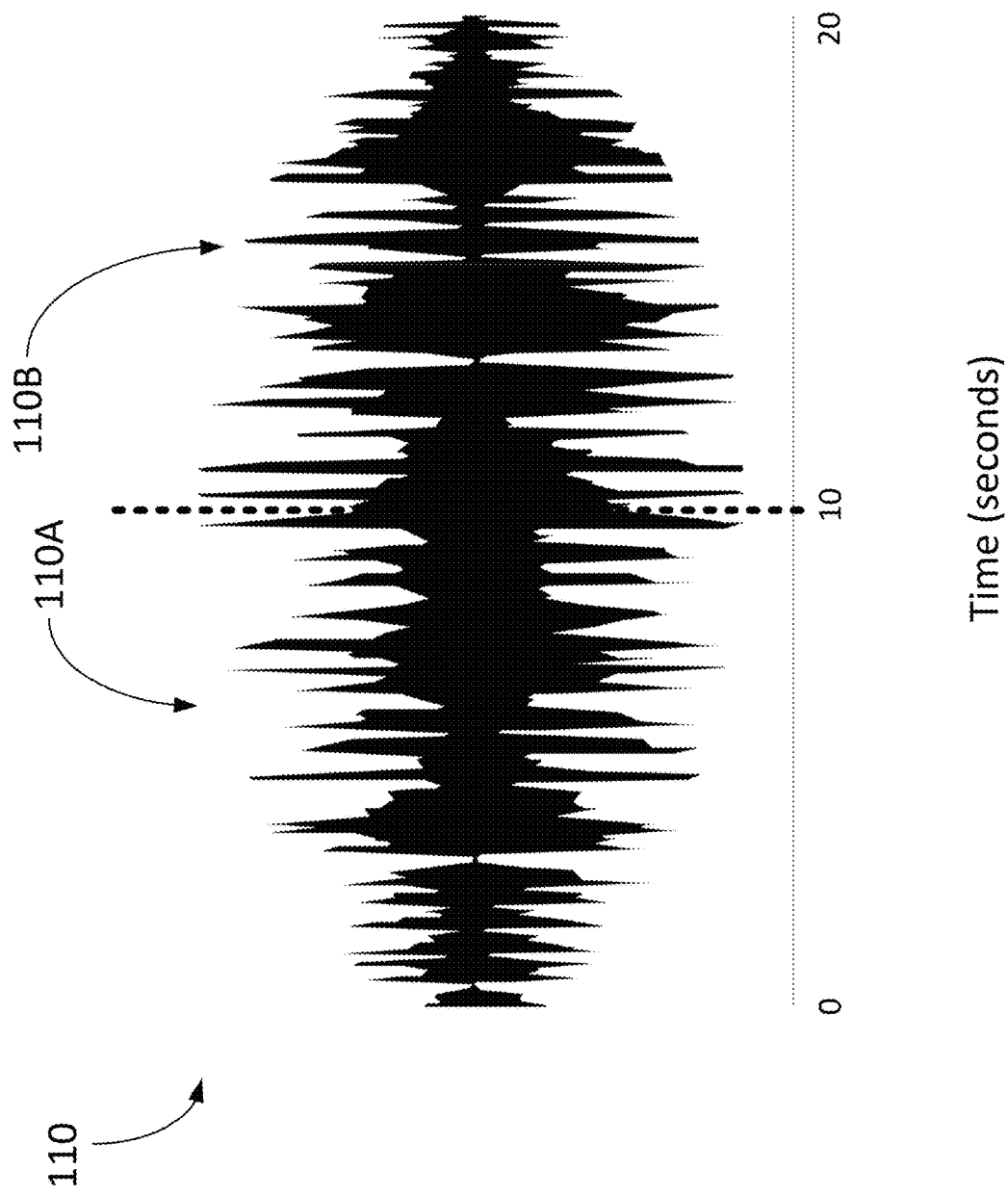
FIG. 4 schematically shows the received speech in accordance with illustrative embodiments of the invention.

The process then proceeds to step 304, which receives the speech 110 from the speaker 102. The speech 110 is first received by the input 208, and then is received by the first stage 112. FIG. 4 schematically shows the received speech 110 in accordance with illustrative embodiments of the invention. For the sake of example, assume that the first stage 112 is configured to receive inputs of 10-seconds of audio at a time, which is segmented into 50% overlapping sliding windows of 2-seconds.

The temporal receptive field 209 breaks down the speech 110 into speech chunks 110A and 110B (e.g., 10-seconds) that can be received by the input of the first stage 112. The speech 110 and/or the speech chunks 110A and 110B may then be processed by the segmenter 234 (e.g., of the first stage 112). For example, as shown in FIG. 4, 20-seconds of the speech 110 may be received by the input 208, and may be filtered by the temporal receptive field 209 into 10-second chunks 110A and 110B.

Figure 5:
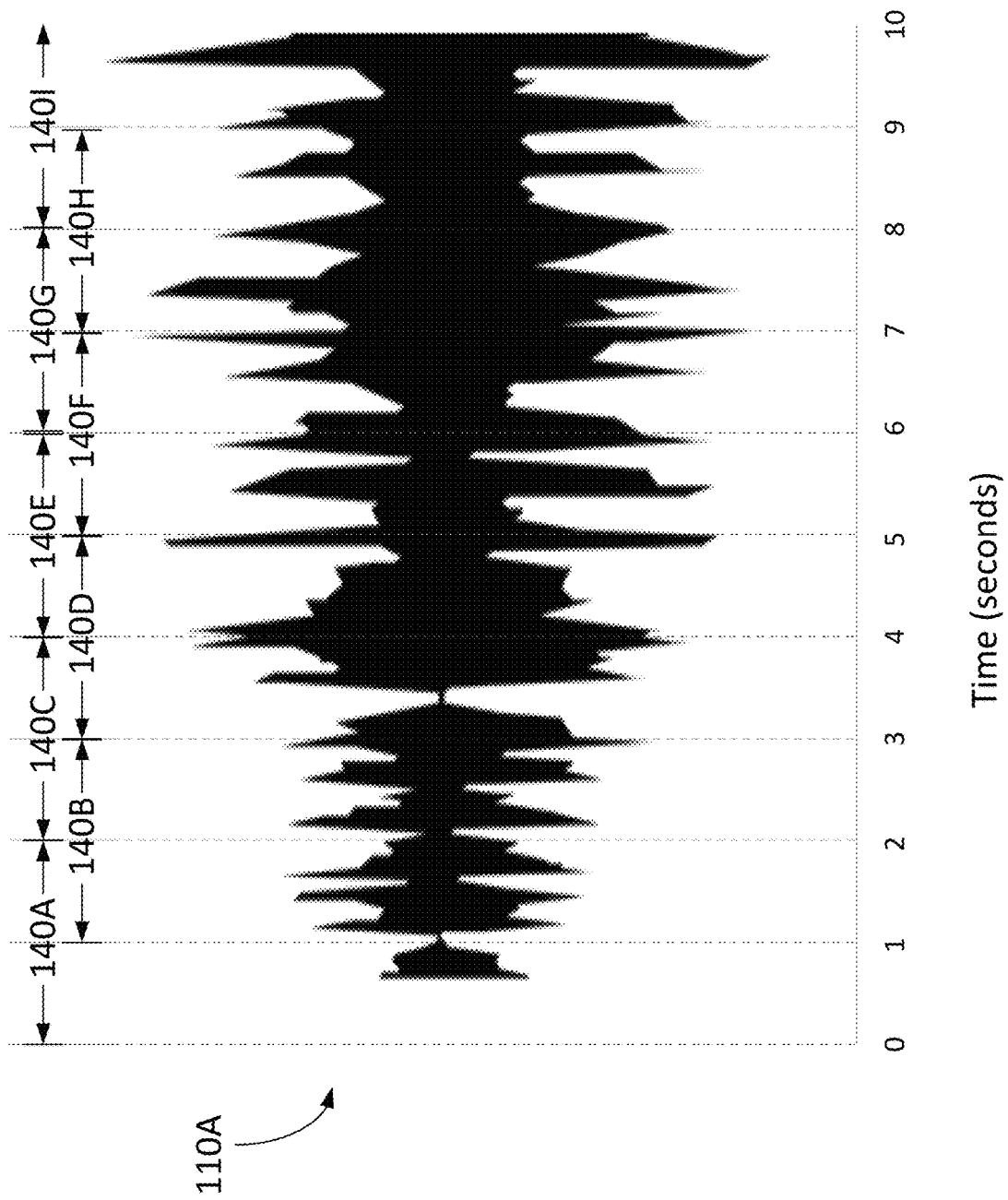
FIG. 5 schematically shows the speech chunk segmented by the segmenter in accordance with illustrative embodiments of the invention.

The process then proceeds to step 306, which segments the speech 110 into analytical segments. FIG. 5 schematically shows the speech chunk 110A segmented by the segmenter 234 in accordance with illustrative embodiments of the invention. As described previously, the speech segmenter 234 is configured to segment the received speech 110 into segments 140 that are analyzed by the respective stage 115. These segments 140 are referred to as analytical segments 140 and are considered to be part of the speech 110. In the current example, the first stage 112 is configured to analyze segments 140 that are in 50% overlapping sliding windows of 2-seconds. Accordingly, the speech chunk 110A is broken down into analytical segments 140A-140I.

The various analytical segments run in 2-second intervals that overlap 50%. Therefore, as shown in FIG. 5, segment 140A is seconds 0:00-0:02 of the chunk 110A, segment 140B is time 0:01-0:03 of the chunk 110A, segment 140C is time 0:02-0:04 of the chunk 110A, and so on for each segment 140 until the chunk 110A is completely covered. This process is repeated in a similar manner for subsequent chunks (e.g., 110B). In some embodiments, the stage 115 may analyze the entire chunk 110A, or all the speech 110, depending on the machine learning 215 model of the stage 115. Thus, in some embodiments, all the speech 110 and/or the chunks 110A, 110B may be the analytical segments 140.

With the short segments 140 (e.g., 2-seconds) analyzed by the first stage 115, it is possible to detect if the speaker 102 is speaking, yelling, crying, silent, or saying a particular word, among other things. The analytical segment 140 length is preferably long enough to detect some or all of these features. Although a few words may fit in the short segment 140, it is difficult to detect entire words with a high level of accuracy without more context (e.g., longer segments 140).

The process then proceeds to step 308, which asks if a session context flag was received from the context flagger 220. To that end, the context flagger 220 queries the server, and determines whether there were any toxicity determinations within a pre-defined period of time of previous speech 110 from the speaker 102. For example, a session context flag may be received if speech 110 from the speaker 102 was determined toxic by the final stage 115 within the last 2 minutes. The session context flag provides context to the stage 115 that receives the flag (e.g., a curse word detected by another stage 115 means the conversation could be escalating to something toxic). Accordingly, if the session context flag is received, the process may proceed to step 310, which decreases the toxicity threshold for the stage 115 that receives the flag. Alternatively, in some embodiments, if the session context flag is received, the speech 110 may automatically be uploaded to subsequent stage 115. The process then proceeds to step 312. If no flag is received, the process proceeds directly to step 312 without adjusting the toxicity threshold.

At step 312, the process analyzes the speech 110 (e.g., the speech chunk 110A) using the first stage 115. In the present example, the first stage 115 runs machine learning 215 (e.g., a neural network on the speaker device 120) that analyzes the 2-second segments 140 and determines an individual confidence output for each segment 140 input. The confidence may be represented as a percentage.

To determine the confidence interval, the stage 115 (e.g., neural network 215) may have previously been trained using a set of training data in the training database 216. The training data for the first stage 115 may include a plurality of negative examples of toxicity, meaning, speech that does not contain toxicity and can be discarded. The training data for the first stage 115 may also include a plurality of positive examples of toxicity, meaning, speech that does contain toxicity and should be forwarded to the next stage 115. The training data may have been obtained from professional voice actors, for example. Additionally, or alternatively, the training data may be real speech that has been pre-classified by the human moderator 106.

At step 314, the first stage 115 determines a confidence interval of toxicity for the speech chunk 110A and/or for each of the segments 140. The confidence interval for the chunk 110A, 110B may be based on the analysis of the various segments 140 from the trained machine learning.

In various embodiments, the first stage 115 provides toxicity thresholds for each segment 140A-140I. However, step 316 determines whether the speech 110 and/or the speech chunk 110A meet the toxicity threshold to be passed on to the next stage 115. In various embodiments, the first stage 115 uses different ways of determining the toxicity confidence for the speech chunk 110A based on the various toxicity confidences of the segments 140A-140I.

A first option is to use the maximum confidence from any segment as the confidence interval for the entire speech chunk 110A. For example, if segment 140A is silence, there is 0% confidence of toxicity. However, if segment 140B contains a curse word, there may be an 80% confidence of toxicity. If the toxicity threshold is 60%, at least one segment 140B meets the threshold, and the entire speech chunk 110A is forwarded to the next stage.

Another option is to use the average confidence from all segments in the speech chunk 110A as the confidence for the speech chunk 110A. Thus, if the average confidence does not exceed the toxicity threshold, the speech chunk 110A is not forwarded to the subsequent stage 115. A further option is to use the minimum toxicity from any segment 140 as the confidence for the speech chunk 110A. In the current example provided, using the minimum is not desirable, as it is likely to lead to a large amount of potentially toxic speech being discarded because of periods of silence within one of the segments 140. However, in other implementations of the stages 115, it may be desirable. A further approach is to use another neural network to learn a function that combines the various confidences of the segments 140 to determine the overall toxicity threshold for the speech chunk 110A.

The process then proceeds to step 316, which asks if the toxicity threshold for the first stage 115 is met. If the toxicity threshold for the first stage is met, the process proceeds to step 324, which forwards the toxic filtered-through speech 124 to the second stage 115. Returning to FIG. 1A, it should be apparent that not all speech 110 makes it through the first stage 115. Thus, the speech 110 that does make it through the first stage 115 is considered to be the toxic filtered speech 124.

Steps 312-316 are repeated for the all remaining chunks 110B.

If the toxicity threshold is not met for the first stage at step 316, the process proceeds to step 318, where the non-toxic speech is filtered out. The non-toxic speech is then discarded at step 320, becoming the discarded speech 111.

In some embodiments, the process proceeds to step 322, where the random uploader 218 passes a small percentage of the filtered-out speech to the second stage 115 (despite the filtered-out speech having not met the toxicity threshold for the first stage 115). The random uploader 218 passes through a small percentage of all the filtered-out speech (also referred to as negatives) to the subsequent stage 115, and the subsequent stage 115 samples a subset of the filtered speech 124. In various embodiments, the more advanced second stage 115 analyzes a random percentage of the negatives from the first stage 115.

As described previously, in general, the first stage 115 is computationally more efficient than subsequent stages 115. Therefore, the first stage 115 filters out speech that is unlikely to be toxic, and passes on speech that is likely to be toxic for analysis by more advanced stages 115. It may seem counter-intuitive to have subsequent stages 115 analyze the filtered-out speech. However, by analyzing a small portion of the filtered-out speech, two advantages are obtained. First, the second stage 115 detects false negatives (i.e., filtered-out speech 111 that should have been forwarded to the second stage 115). The false negatives may be added to the training database 216 to help further train the first stage 115, and to reduce the likelihood of future false negatives. Furthermore, the percentage of the filtered-out speech 111 that is sampled is small (e.g., 1%-0.1%), thereby not overly wasting many resources from the second stage 115.

An example of an analysis that may be performed by the second stage at step 324 is described below. In various embodiments, the second stage 115 may be a cloud-based stage. The second stage 115 receives the speech chunk 110A as an input, if uploaded by the first stage 115 and/or the random uploader 218. Thus, continuing the previous example, the second stage 115 may receive the 20-second chunk 110A.

The second stage 115 may be trained using a training data set that includes, for example, human moderator 106 determined age and emotion category labels corresponding to a dataset of human speaker 102 clips (e.g., adult and child speakers 102). In illustrative embodiments, a set of content moderators may manually label data obtained from a variety of sources (e.g., voice actors, Twitch streams, video game voice chat, etc.).

The second stage 115 may analyze the speech chunk 110A by running the machine learning/neural network 215 over the 20-second input speech chunk 110A, producing a toxicity confidence output. In contrast to the first stage 115, the second stage 115 may analyze the 20-second speech chunk 110A as an entire unit, as opposed to divided segments 240. For example, the second stage 115 may determine that speech 110 with an angry emotion is more likely to be toxic. In a similar manner, the second stage 115 may determine that a teenage speaker 102 may be more likely to be toxic. Furthermore, the second stage 115 may learn some of the distinctive features of certain aged speakers 102 (e.g., vocabulary and phrases that are added into the confidence).

Furthermore, the second stage 115 may be trained using negative and positive examples of speech toxicity from the subsequent stage 115 (e.g., the third stage 115). For example, speech 110 that is analyzed by the third stage 115 and found not to be toxic may be incorporated into the training of the second stage. In a similar manner, speech that is analyzed by the third stage 115 and is found to be toxic may be incorporated into the training of the second stage.

The process then proceeds to step 326, which outputs the confidence interval for the toxicity of the speech 110 and/or speech chunk 110A. Because the second stage 115, in this example, analyzes the entirety of the speech chunk 110A, a single confidence interval is output for the entire chunk 110A. Furthermore, the second stage 115 may also output an estimate of emotion and speaker age based on the timbre in the speech 110.

The process then proceeds to step 328, which asks whether the toxicity threshold for the second stage is met. The second stage 115 has a pre-set toxicity threshold (e.g., 80%). If the toxicity threshold is met by the confidence interval provided by step 326, then the process proceeds to step 336 (shown in FIG. 3B). If the toxicity threshold is not met, the process proceeds to step 330. Steps 330-334 operate in a similar manner to steps 318-322. Thus, the discussion of these steps in not repeated here in great detail. However, it is worth mentioning again that a small percentage (e.g., less than 2%) of the negative (i.e., non-toxic) speech determined by the second stage 115 is passed along to the third stage 115 to help retrain the second stage 115 to reduce false negatives. This process provides similar advantages to those described previously.

As shown in FIG. 3B, the process proceeds to step 336, which analyzes the toxic filtered speech using the third stage 115. The third stage 115 may receive the 20-seconds of audio that are filtered through by the second stage 115. The third stage 115 may also receive an estimate of the speaker 102 age from the second stage 115, or a most common speaker 102 age category. The speaker 102 age category may be determined by the age analyzer 222. For example, the age analyzer 222 may analyze multiple parts of the speech 110 and determine that the speaker 102 is an adult ten times, and a child one time. The most common age category for the speaker is adult. Furthermore, the third stage 115 may receive transcripts of previous speech 110 in the conversation that have reached the third stage 115. The transcripts may be prepared by the transcription engine 228.

The third stage 115 may be initially trained by human produced transcription labels corresponding to a separate data of audio clips. For example, humans may transcribe a variety of different speech 110, and categorize that transcript as toxic or non-toxic. The transcription engine 228 may thus be trained to transcribe speech 110 and analyze the speech 110 as well.

As the transcription engine 228 analyzes filtered speech and transcribes it, some of the speech is determined to be toxic by the third stage 115 and is forwarded to the moderator 106. The moderator 106 may thus provide feedback 132 regarding whether the forwarded toxic speech was a true positive, or a false positive. Furthermore, steps 342-346, which are similar to steps 330-334, use the random uploader to upload random negative samples from the third stage. Accordingly, the moderator 106 may provide further feedback 132 regarding whether the uploaded random speech was a true negative, or a false negative. Accordingly, the stage 115 is further trained using positive and negative feedback from the moderator 106.

When analyzing the filtered speech, the third stage 115 may transcribe the 20-seconds of speech into text. In general, transcription by machine learning is very expensive and time-consuming. Therefore, it is used at the third stage 115 of the system. The third stage 115 analyzes the 20-seconds of transcribed text, producing clip-isolated toxicity categories (e.g., sexual harassment, racial hate speech, etc.) estimates with a given confidence.

Using previously transcribed clips that have reached the third stage 115 in the conversation, the probabilities of the currently transcribed categories are updated based on the previous clips. Accordingly, the confidence for a given toxicity category is increased if a previous instance of that category has been detected.

In various embodiments, the user context analyzer 226 may receive information regarding whether any members of the conversation (e.g., the speaker 102 and/or the listener 104) is estimated to be a child (e.g., determined by the second stage 115). If any members of the conversation are deemed to be a child, the confidence may be increased and/or the threshold may be decreased. Accordingly, the third stage 115 is trained, in some embodiments, to be more likely to forward the speech 110 to the moderator if a child is involved.

The process then proceeds to step 338, where the third stage 115 outputs the confidence interval for speech toxicity for the filtered speech. It should be understood that the confidence output will depend on the training. For example, if a particular toxicity policy is unconcerned by general curse words, but only cares about harassment, the training takes that into account. Accordingly, the stages 115 may be adapted to account for the type of toxicity, if desired.

The process then proceeds to step 340, which asks if the toxicity threshold for the third stage has been met. If yes, the process proceeds to step 348, which forwards the filtered speech to the moderator. In various embodiments, the third stage 115 also outputs the transcript of the speech 110 to the human moderator 106. If no, the speech is filtered out at step 342 and then discarded at step 344. However, the random uploader 218 may pass a portion of the filtered-out speech to the human moderator, as described previously with reference to other stages 115.

At step 350, the moderator 106 receives the toxic speech that has been filtered through a multi-stage system 100. Accordingly, the moderator 106 should see a considerably filtered amount of speech. This helps resolve issues where moderators are manually called by players/users.

If the moderator determines that the filtered speech is toxic in accordance with the toxicity policy, the process proceeds to step 352, which takes corrective action. The moderator's 106 evaluation of "toxic" or "not toxic" could also be forwarded to another system which itself determines what corrective action (if any) should be taken, including potentially doing nothing, e.g., for first time offenders. The corrective action may include a warning to the speaker 102, banning the speaker 102, muting the speaker 102, and/or changing the speaker's voice, among other options. The process then proceeds to step 354.

At step 354 the training data for the various stages 115 are updated. Specifically, the training data for the first stage 115 is updated using the positive determinations of toxicity and the negative determinations of toxicity from the second stage 115. The training data for the second stage 115 is updated using the positive determinations of toxicity and the negative determinations of toxicity from the third stage 115. The training data for the third stage 115 is updated using the positive determinations of toxicity and the negative determinations of toxicity from the moderator 106.

Accordingly, each subsequent stage 115 (or moderator) trains the prior stage 115 regarding whether its determination of toxic speech was accurate or not (as judged by the subsequent stage 115 or the moderator 106).

In various embodiments, the prior stage 115 is trained by the subsequent stage 115 to better detect false positives (i.e., speech considered toxic that is not toxic). This is because the prior stage 115 passes on speech that it believes is toxic (i.e., meets the toxicity threshold for the given stage 115). Furthermore, steps 322, 334, and 346 are used to train the subsequent stage to better detect false negatives (i.e. speech considered non-toxic that is toxic). This is because the random sampling of discarded speech 111 is analyzed by the subsequent stage 115.

Together, this training data causes the system 100 to overall become more robust and improve over time. Step 354 may take place at a variety of times. For example, step 354 may be run adaptively in real-time after as each stage 115 completes its analysis. Additionally, or alternatively, the training data may be batched in different time intervals (e.g., daily or weekly) and used to retrain the model on a period schedule.

The process then proceeds to step 356, which asks if there is more speech 110 to analyze. If there is, the process returns to step 304, and the process 300 begins again. If there is no more speech to analyze, the process may come to an end.

The content moderation system is thus trained to decrease rates of false negatives and false positives over time. For example, the training could be done via gradient descent, or Bayesian optimization, or evolutionary methods, or other optimization techniques, or combinations of multiple optimization techniques, depending on the implementation or type of system in the stage. If there are multiple separate components in the stage 115, they may be trained via different techniques It should be noted that this process is simplified from a longer process that normally would be used to determine whether speech is toxic in accordance with illustrative embodiments of the invention. Accordingly, the process of determining whether speech is toxic has many steps that those skilled in the art likely would use. In addition, some of the steps may be performed in a different order than that shown or skipped altogether. Additionally, or alternatively, some of the steps may be performed at the same time. Those skilled in the art therefore can modify the process as appropriate.

Although various embodiments refer to "discarding" speech, it should be understood that the term does not necessarily imply that the speech data is deleted or thrown away. Instead, the discarded speech may be stored. Discarded speech is merely intended to illustrate that the speech is not forwarded to a subsequent stage 115 and/or moderator 106.

Figure 6:
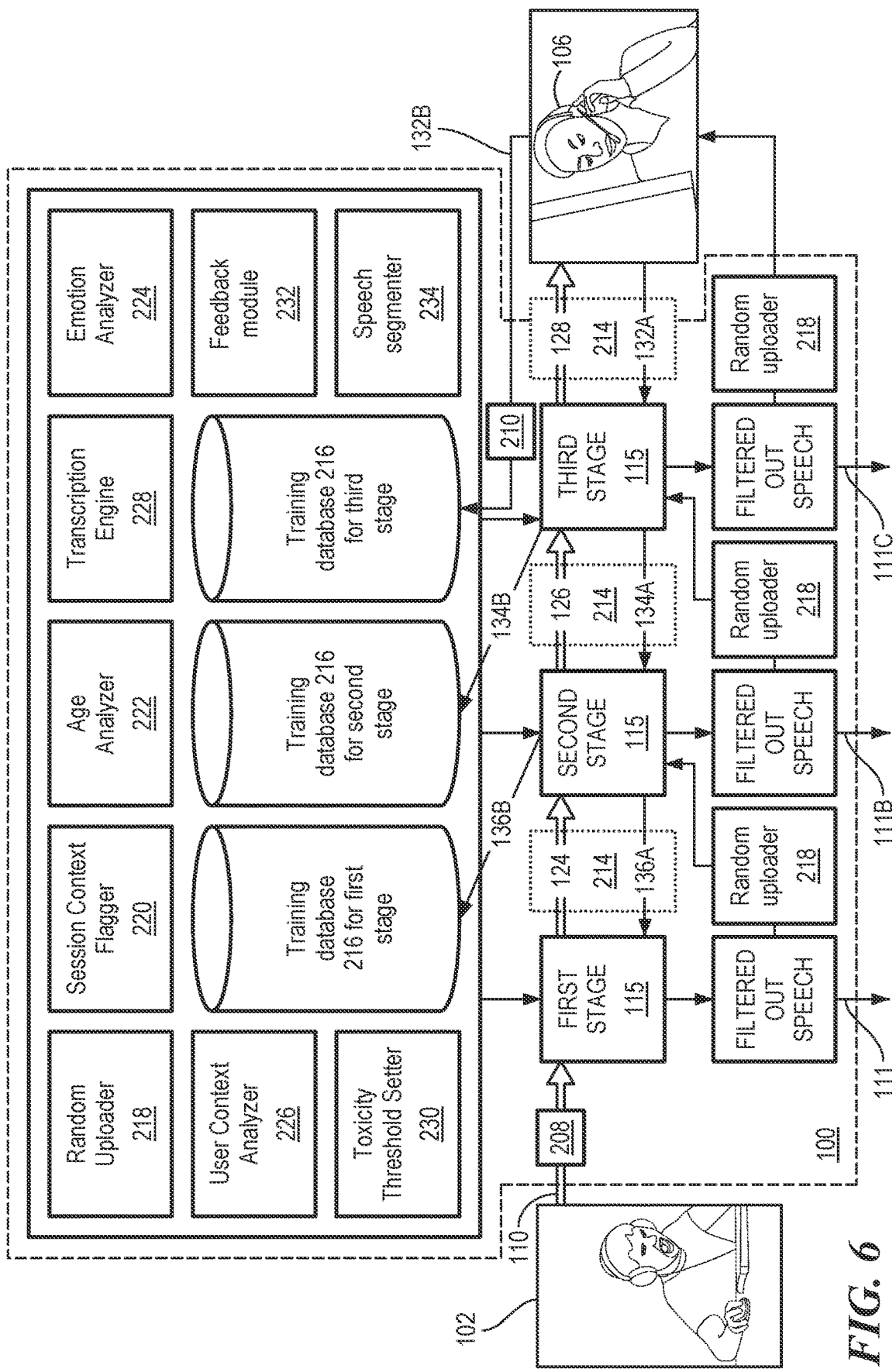
FIG. 6 schematically shows details of the system that can be used with the process of FIGS. 3A-3B in accordance with illustrative embodiments.

FIG. 6 schematically shows details of the system 100 that can be used with the process of FIGS. 3A-3B in accordance with illustrative embodiments. FIG. 6 is not intended to limit used of the process of FIGS. 3A-3B. For example, the process of FIGS. 3A-3B may be used with a variety of moderation content systems 100, including the systems 100 shown in FIGS. 1A-1C.

In various embodiments, the stages 115 may receive additional inputs (such as information about the speaker's 102 geographic location, IP address or information on other speakers 102 in the session such as Session Context) and produce additional outputs that are saved to a database or input into future stages 115 (such as age estimations of the players).

Throughout the course of operation of the system 100, additional data is extracted and used by the various stages 115 to assist in decision-making, or to provide additional context around the clip. This data can be stored in a database, and potentially combined with historical data to create an overall understanding of a particular player. The additional data may also be aggregated across time periods, geographical regions, game modes, etc. to provide a high-level view of the state of content (in this case, chat) in the game. For example, the transcripts could be aggregated in an overall picture of the frequency of usage of various terms and phrases, and that can be charted as it evolves over time. Particular words or phrases whose usage frequency changes over time may be brought to the attention of administrators for the platform, who could use their deep contextual knowledge of the game to update the configuration of the multi-stage triage system to account for this change (e.g., weigh a keyword more strongly when evaluating chat transcripts, if the keyword changes from positive to negative connotation). This can be done in conjunction with other data—for example, if a word's frequency stays constant but the sentiment of the phrases in which it is used changes from positive to negative, it may also be highlighted. The aggregated data can be displayed to administrators of the platform via a dashboard, showing charts, statistics, and evolutions over time of the various extracted data.

Although FIG. 6 shows various segments of the system 100 as being separate (e.g., the first stage 115 and the random uploader 218), this is not intended to limit various embodiments. The random uploader 218 and other components of the system may be considered to be part of the various stages 115, or separate from the stages 115.

As generally described in FIGS. 3A-3B, the speaker 102 provides the speech 110. The speech 110 is received via the input 208, which breaks down the speech 110 into the chunks 110A, 110B digestible by the stage 115. In some embodiments, the speech 110 does not get broken into chunks 110A, 110B, and may be received by the stage as is. The segmenter 234 may further breakdown the chunks 110A, 110B into analytical segments 240. However, in some embodiments, the chunks 110A, 110B may be analyzed as an entire unit, and therefore, may be considered analytical segments 240. Furthermore, in some embodiments, the entire speech 110 may be analyzed as a unit, and therefore may be considered an analytical segment 140.

The first stage 115 determines that some portion of the speech 110 is potentially toxic, and passes that portion of the speech 110 (i.e., filtered speech 124) to the subsequent stage 115. However, some of the speech 110 is considered not to be toxic, and therefore, is discarded. As mentioned previously, to assist with the detecting of false negatives (i.e., to detect speech that is toxic, but was considered to be not toxic), the uploader 218 uploads some percentage of the speech to a subsequent stage 115 for analysis. When the subsequent stage 115 determines that the uploaded speech was in fact a false negative, it may directly communicate with the first stage 115 (e.g., feedback 136A) and/or may update the training database for the first stage (feedback 136B). The first stage 115 may be retrained adaptively on the go, or at a prescheduled time. Accordingly, the first stage 115 is trained to reduce false negatives.

The filtered toxic speech 124 is received and analyzed by the second stage 115, which determines whether the speech 124 is likely to be toxic. The filtered toxic speech 124 was found to be positive for toxicity by the first stage 115. The second stage 115 further analyzes the filtered toxic speech 124. If the second stage 115 determines that the filtered speech 124 is not toxic, then it discards the speech 124. But the second stage 115 also provides feedback to the first stage 115 (either directly via feedback 136A or by updating the training database via feedback 136B) that the filtered speech 124 was a false positive. The false positive may be included in the database 216 as a false positive. Accordingly, the first stage 115 may be trained to reduce false positives.

Furthermore, the second stage 115 passes the speech 124 that it believes is likely to be toxic as toxic speech 126. Speech 124 that it believes is not likely to be toxic becomes discarded speech 111B. However, some portion of that discarded speech 111B is uploaded by the random uploaded 218 (to reduce the false negatives of the second stage 115).

The third stage 115 receives the further filtered toxic speech 126, and analyzes the speech 126 to determine whether it is likely to be toxic. The filtered toxic speech 126 was found to be positive for toxicity by the second stage 115. The third stage 115 further analyzes the filtered toxic speech 126. If the third stage 115 determines that the filtered speech 126 is not toxic, then it discards the speech 126. But the third stage 115 also provides feedback to the second stage 115 (either directly via feedback 134A or by updating the training database via feedback 134B) that the filtered speech 126 was a false positive. The false positive may be included in the training database 216 as a false positive. Accordingly, the second stage 115 may be trained to reduce false positives.

The third stage 115 passes the speech 126 that it believes is likely to be toxic as toxic speech 128. Speech 126 that it believes is not likely to be toxic becomes discarded speech 111C. However, some portion of that discarded speech 111C is uploaded by the random uploaded 218 (to reduce the false negatives of the third stage 115).

The moderator 106 receives the further filtered toxic speech 128, and analyzes the speech 128 to determine whether it is likely to be toxic. The filtered toxic speech 128 was found to be positive for toxicity by the third stage 115. The moderator 106 further analyzes the filtered toxic speech 128. If the moderator 106 determines that the filtered speech 128 is not toxic, then the moderator 106 discards the speech 128. But the moderator 106 also provides feedback to the third stage 115 (either directly via feedback 132A or by updating the training database via feedback 132B) that the filtered speech 128 was a false positive (e.g., through the user interface). The false positive may be included in the training database 216 as a false positive. Accordingly, the third stage 115 may be trained to reduce false positives.

It should be apparent that various embodiments may have one or more stages 115 (e.g., two stages 115, three stages 115, four stages 115, five stages 115, etc.) distributed over multiple devices and/or cloud servers. Each of the stages may operate using different machine learning. Preferably, earlier stages 115 use less compute than later stages 115 on a per speech length analysis. However, by filtering out speech 110 using a multi-staged process, the more advanced stages receive less and less speech. Ultimately, the moderator receives a very small amount of speech. Accordingly, illustrative embodiments solve the problem of moderating large platform voice content moderation efficiently.

As an example, assume that the first stage 115 is so low-cost (computationally) that the first stage can analyze 100,000 hours of audio for $10,000. Assume that the second stage 115 is something that is too expensive to process all 100,000 hours of audio, but can process 10,000 hours for $10,000. Assume that the third stage 115 is even more compute intensive, and that the third stage 115 can analyze the 1,000 hours for $10,000. Accordingly, it is desirable to optimize the efficiency of the system such that the likely toxic speech is progressively analyzed by more advanced (and in this example, expensive) stages, while non-toxic speech is filtered out be more efficient and less advanced stages.

Although various embodiments refer to voice modulation, it should be understood that a similar process may be used for other types of content, such as images, text and video. In general, text does not have the same high-throughput problems as audio. However, video and images may suffer from similar throughput analysis issues.

The multi-stage triage system 100 may also be used for other purposes (e.g., within the gaming example). For example, while the first two stages 115 may stay the same, the second stage's 115 output could additionally be sent to a separate system.

Furthermore, although various embodiments refer to moderation of toxicity, it should be understood that the systems and methods described herein may be used to moderate any kind of speech (or other content). For example, instead of monitoring for toxic behavior, the system 100 might monitor for any specific content (e.g., product mentions or discussions around recent changes "patches" to the game), in order to discover player sentiment regarding these topics. Similar to the moderation system, these stages could aggregate their findings, along with extracted data, in a database and present it via a dashboard to administrators. Similarly, vocabulary and related sentiment can be tracked and evolve over time. The stages 115 can output likely product mentions to a human moderation team to verify and determine sentiment—or, if the stage(s) 115 are confident about a topic of discussion and associated sentiment, they could save their findings to the database and filter the content out from subsequent stages, making the system more compute efficient.

The same may be done for other enforcement topics, such as cheating or "gold selling" (selling in-game currency for real money). There could be stages 115 which similarly triage for possible violations to enforce (for example, looking for mentions of popular cheating software, the names of which can evolve over time), and similarly a human moderation team which may make enforcement decisions on clips passed on from stage 115.

Accordingly, using artificial intelligence or other known techniques, illustrative embodiments enable the later stages to improve the processing of the earlier stages to effectively move as much intelligence closer to or on the user device. This enables more rapid and effective moderation with decreasing need for the later, slower stages (e.g., that are off-device).

Furthermore, although various embodiments refer to stages 115 as outputting a confidence interval, in some embodiments, the stages 115 may output their confidence in another format (e.g., as a yes or no, as a percentage, as a range, etc.). Further, instead of filtering out content completely from the moderation pipeline, stages could prioritize content for future stages or as an output from the system without explicitly dismissing any of it. For example, instead of dismissing some content as unlikely to be disruptive, a stage could give the content a disruptiveness score, and then insert it into a prioritized list of content for later stages to moderate. The later stages can retrieve the highest scoring content from the list and filter it (or potentially prioritize it into a new list for even later stages). Therefore, the later stages could be tuned to use some amount of compute capacity, and simply prioritize moderating the content that is most likely to be disruptive, making efficient use of a fixed compute budget.

Figure 7:
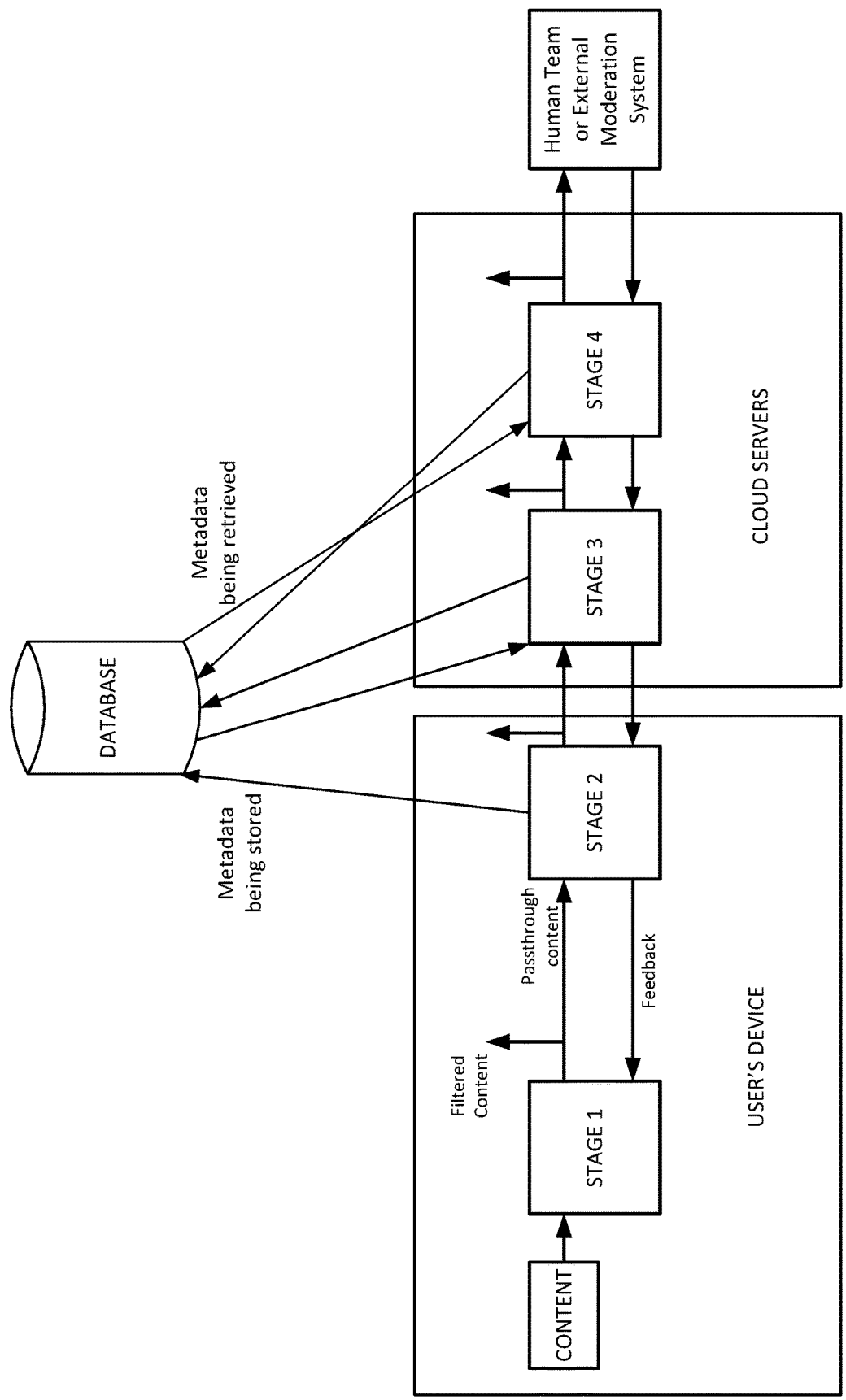
FIG. 7 schematically shows a four-stage system in accordance with illustrative embodiments of the invention.

FIG. 7 schematically shows a four-stage system in accordance with illustrative embodiments of the invention. The multi-stage adaptive triage system is computationally efficient, cost effective, and scalable. Earlier stages in the system can be configured/architected to run more efficiently (e.g., more rapidly) than later stages, keeping costs low by filtering the majority of the content out before less efficient, slower, but more powerful later stages are used. The earliest stages may even be run on user's devices locally, removing cost from the platform. These early stages adapt towards filtering out the content that is discernible given their context by updating themselves with feedback from later stages. Since later stages see dramatically less content overall, they can be afforded larger models and more computational resources, giving them better accuracy and allowing them to improve on the filtering done by earlier stages. By using the computationally efficient early stages to filter easier content, the system maintains high accuracy with efficient resource usage, primarily employing the more powerful later stage models on the less easy moderation decisions which require them. Additionally, multiple options for different stages later in the system may be available, with earlier stages or other supervising systems choosing which next stage is appropriate based on the content, or extracted or historical data—or based on a cost/accuracy tradeoff considering stage options, etc.

In addition to filtering out likely non-disruptive content, the stages may also separately filter easily discernible disruptive content, and potentially take autonomous action on that content. For example, an early stage performing on-device filtering could employ censoring on detected keywords indicative of disruptive behavior, while passing on cases where it is unable to detect the keywords on to a later stage. As another example, an intermediate stage could detect disruptive words or phrases missed by earlier stages, and issue the offending user a warning shortly after detection, potentially dissuading them for being disruptive for the remainder of their communication. These decisions could also be reported to later stages.

Earlier stages in the system may perform other operations that assist later stages in their filtering, thereby distributing some of the later stage computation to earlier in the pipeline. This is especially relevant when the earlier stage generates useful data or summaries of the content that could also be used by a later stage, avoiding repeated computation. The operation may be a summarization or semantically meaningful compression of the content which is passed to later stages instead of the content itself—thereby also reducing bandwidth between the stages—or in addition to it. The operation may be extracting certain specific properties of the content which could be useful for purposes outside of the moderation task, and could be passed along as metadata. The extracted property could itself be stored or combined with historical values to create an averaged property value that may be more accurate or a history of the value's evolution over time, which could be used in later stages to make filtering decisions.

The system can be configured to weigh different factors in moderation with more or less priority, based on the preferences or needs of the platform employing moderation. The final stage of the system may output filtered content and/or extracted data to a team of human moderators, or configurable automated system, which will pass decisions back to the system, allowing itself to update and make decision more in-line with that team or system in the future. Individual stages may also be configured directly or updated indirectly given feedback from an outside team or system, allowing a platform control over how the system uses various features of the content to make moderation decisions. For example, in a voice chat moderation system, one intermediate stage might extract text from the speech content, and compare that text to a (potentially weighted) word blacklist—using the result to inform its moderation decision. A human team could directly improve the speech-to-text engine used by providing manually annotated data, or could manually adapt the speech-to-text engine to a new domain (a new language or accent); or the word blacklist (or potentially its severity weights) could be tuned by hand to prioritize moderating certain kinds of content more aggressively.

Since the stages preferably update themselves based on feedback information from later stages the entire system, or at least a portion of the entire system, is able to readily adapt to new or changing environments. The updates can happen online while the system is running, or be batched later for updating, such as in bulk updates or waiting until the system has free resources to update. In the online updating case, the system adapts itself to evolving types of content by making initial filtering decisions on the content, and then receiving feedback from a final team of human moderators or other external automated system. The system can also keep track of extracted properties of the content over time, and show the evolution of the those properties to inform manual configuration of the system.

For example, in a chat moderation use case, the system might highlight a shift in the distribution of language over time—for example, if a new word (e.g., slang) is suddenly being used with high frequency, this new word could be identified and shown in a dashboard or summary—at which point the administrators of the system could configure it to adapt to the changing language distribution. This also handles the case of some extracted properties changing their influence over the decisions of the moderation system—for example, when a chat moderation system is deployed the word "sick" may have a negative connotation; but over time "sick" could gain a positive connotation and the context around its usage would change. The chat moderation system could highlight this evolution (e.g., reporting "the word 'sick' was previous used in sentences with negative sentiment, but has recently begun being used in short positive exclamations"), and potentially surface clarifying decisions to administrators (e.g., "is the word 'sick' used in this context disruptive?") to help it update itself in alignment with the platform's preferences.

An additional problem in content moderation relates to preserving the privacy of the users whose content is being moderated, as the content could contain identifying information. A moderation system could use a separate Personally Identifiable Information (PII) filtering component to remove or censor ("scrub") PII from the content before processing. In the illustrative multi-stage triage system, this PII scrubbing could be a pre-processing step before the system runs, or it could run after some of the stages and use extracted properties of the content to assist in the PII identification.

While this is achievable with pattern matching in text-based systems, PII scrubbing is more difficult in video, imagery, and audio. One approach could be to use content identifying systems such as a speech-to-text or Optical Character Recognition engine coupled with a text-based rules system to backtrack to the location of offending words in the speech, images, or video, and then censor those areas of the content. This could also be done with a facial recognition engine for censoring faces in imagery and video for privacy during the moderation process. And additional technique is using style transfer systems to mask the identity of subjects of the content. For example, an image or video style transfer or "deep fake" system could anonymize the faces present in content while preserving the remainder of the content, leaving it able to be moderated effectively. In the speech domain, some embodiments may include an anonymizer, such as a voice skin or timbre transfer system configured to transform the speech into a new timbre, anonymizing the identifying vocal characteristics of the speaker while leaving the content and emotion of the speech unchanged for the moderation process.

The multi-stage adaptive triage system is applicable to a wide variety of content moderation tasks. For example, the system could moderate image, audio, video, text, or mixed-media posts by users to social media sites (or parts of such sites—such as separate moderation criteria for a "kids" section of the platform). The system could also monitor chat between users on platforms that allow it, either voice, video, or text. For example, in a multiplayer video game the system could monitor live voice chat between players; or the system could moderate text comments or chat on a video streaming site's channels. The system could also moderate more abstract properties, such as gameplay. For example, by tracking the historical playstyle of a player in a video game or the state of a particular game (score, etc.), the system could detect players which are playing abnormally (e.g., intentionally losing or making mistakes in order to harass their teammates) or it could detect various playstyles that should be discouraged (e.g., "camping" where a player attacks others as they spawn into the game before they can react, or a case where one player targets another player exclusively in the game).

Beyond content moderation for disruptive behavior, the multi-stage adaptive triage system of various embodiments can be used in other contexts to process large amounts of content. For example, the system could be used to monitor employee chats within a company for discussion of secret information. The system could be used to track sentiment for behavior analysis or advertising, for example by listening for product or brand mentions in voice or text chat and analyzing whether there is positive or negative sentiment associated with it, or by monitoring for reactions of players in a game to new changes that the game introduced. The system could be employed to detect illegal activity, such as sharing illicit or copyrighted images, or activity that is banned by the platform, such as cheating or selling in-game currency for real money in games.

As an example, consider one potential use of a multi-stage adaptive triage system in the context of moderating voice chat in a multiplayer game. This first stage in the system could be a Voice Activity Detection system that filters out when a user is not speaking, and may operate on windows of a few 100 milliseconds or 1 second of speech at a time. The first stage could use an efficient parameterized model for determining whether a particular speaker is speaking, which can adapt or be calibrated based on the game or region, and/or on additional information such as the user's audio setup or historical volume levels. Furthermore, various stages can classify what types of toxicity or sounds the user is making sounds (e.g., blaring an airhorn into voice chat). Illustrative embodiments may classify the sound (e.g., scream, cry, airhorn, moan, etc.) to help classify the toxicity for the moderator 106.

In addition to filtering out audio segments in which the user is not speaking or making sounds, the first stage can also identify properties of the speech content such as typical volume level, current volume level, background noise level, etc., which can be used by itself or future stages to make filtering decisions (for example, loud speech could be more likely to be disruptive). The first stage passes along audio segments that likely contained speech to the second stage, as well as a small portion of the segments that were unlikely to contain speech, in order to get more informative updates from the second stage and to estimate its own performance. The second stage passes back information on which segments it determined were unlikely to be moderated, and the first stage updates itself to better mimic that reasoning in the future.

While the first stage operates only on short audio segments, the second stage operates on 15 second clips, which may contain multiple sentences. The second stage can analyze tone of voice and basic phonetic content, as well as use historical information about the player to make better decisions (e.g., does the player having rapid shifts in tone normally correlate with disruptive behavior?). The second stage can also make more informed decisions about speaking vs. non-speaking segments than the first stage, given its much larger temporal context, and can pass its decisions back to the first stage to help it optimize. However, the second stage requires substantially more compute power to perform its filtering than the first stage, so the first stage triaging out silence segments keeps the second stage efficient. Both the first and second stage may run on the user's device locally, requiring no compute cost directly from the game's centralized infrastructure.

In an extension to this example, the first stage could additionally detect sequences of phonemes during speech that are likely associated with swear words or other bad language. The first stage could make an autonomous decision to censor likely swear words or other terms/phrases, potentially by silencing the audio for the duration or substituting with a tone. A more advanced first stage could substitute phonemes in the original speech to produce a non-offensive word or phrase (for example, turn "f**k" to "fork"), in either a standard voice or the player's own voice (via a voice skin, or a specialized text-to-speech engine tuned to their vocal cords).

After the second stage, clips that are not filtered out are passed on to the third stage, which operates on a cloud platform instead of locally on device (although some embodiments can operate more than two stages locally). The third stage has access to more context and more compute power—for example, it could analyze the received 15 second speech clip in relation to the past two minutes of speech in the game, as well as in addition to extra game data (e.g., "is the player currently losing?"). The third stage may create a rough transcript using an efficient speech-to-text engine, and analyze the direct phonetic content of the speech, in addition to tonality metadata passed along from the second stage. If the clip is deemed to be potentially disruptive, it is passed to a fourth stage, which may now incorporate additional information, such as clips and transcripts from other players in the target player's party or game instance, which may be part of a single conversation. The clip and other relevant clips from the conversation may have their transcripts from the third stage refined by a more sophisticated but expensive speech recognition engine. The fourth stage may also include game-specific vocabulary or phrases to assist in understanding the conversation, and it may run sentiment analysis or other language understanding to differentiate between difficult cases (e.g., is a player poking good-natured fun at another player, who they have been friends with (e.g., played many games together) for some time? Or are two players trading insults, each in an angry tone, with the severity of the conversation increasing over time?).

In another extension to this example, the third or fourth stage could detect a rapid change in sentiment, tone, or language by a player that could indicate a severe change in the player's mental state. This could be automatically responded to with a visual or auditory warning to the player, automatically changing the person's voice (e.g., to a high pitch chipmunk) or muting of the chat stream. By contrast, if such rapid changes occur periodically with a particular player, showing no relation to the game state or in-game actions, it could be determined that the player is experiencing period health issues, and punitive action could be avoided while mitigating the impact on other players.

Stage 4 could include even more extra data, such as similar analysis around text chat (potentially also conducted by a separate multi-stage triage system), game state, imagery in-game (such as screenshots), etc.

Clips, along with context and other data, deemed by the fourth stage to be potentially disruptive may be passed to a final human moderation team, which uses their deep contextual knowledge of the game alongside the metadata, properties, transcripts, and context surrounding the clip presented by the multi-stage triage system, to make a final moderation decision. The decision triggers a message to the game studio which may take action based on it (e.g., warning or banning the player involved). The moderation decision information flows back to the fourth stage, along with potential additional data (e.g., "why did a moderator make this decision?"), and operates as training data to help the fourth stage update itself and improve.

Figure 8A:
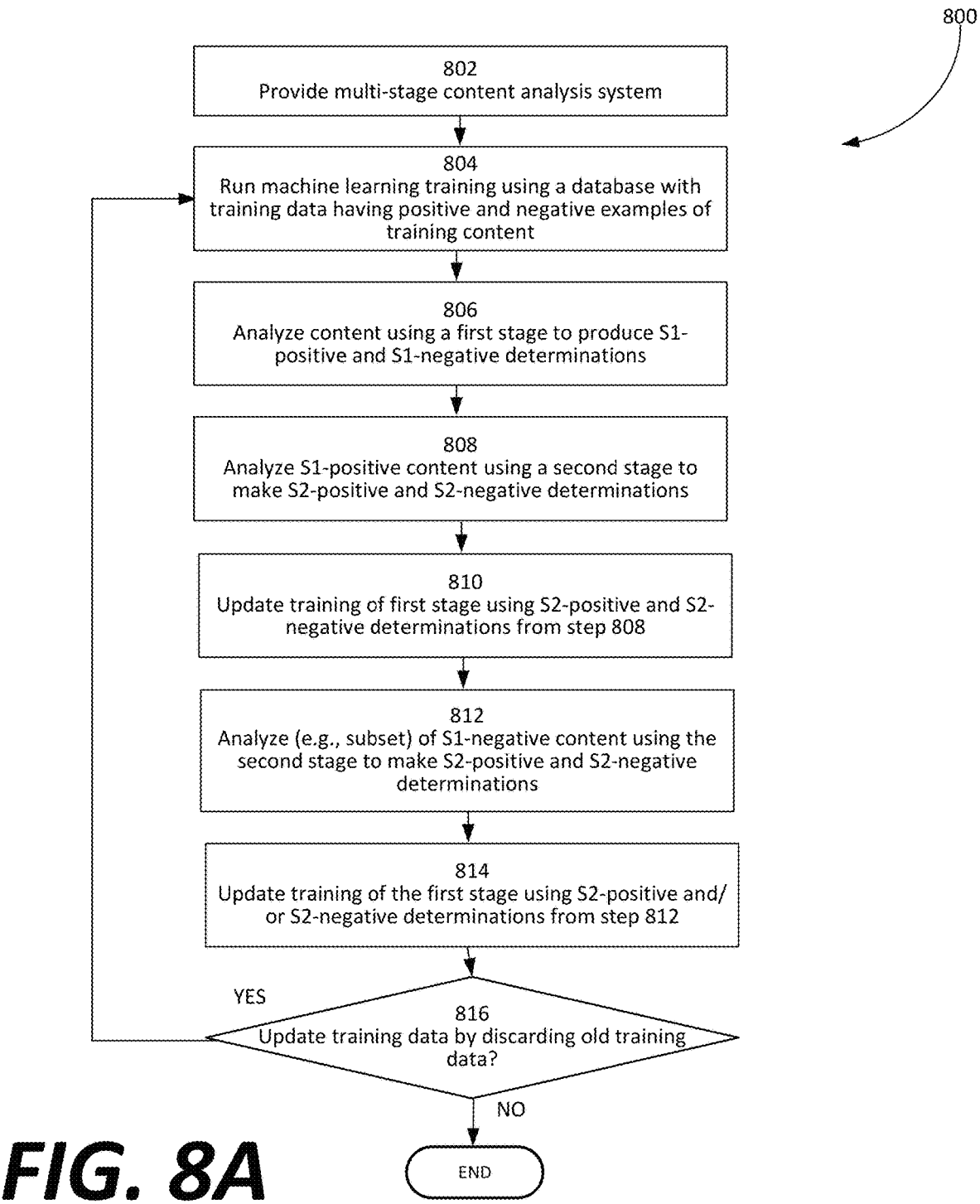
FIG. 8A schematically shows a process of training machine learning in accordance with illustrative embodiments of the invention.

FIG. 8A schematically shows a process of training machine learning in accordance with illustrative embodiments of the invention. It should be noted that this process is simplified from a longer process that normally would be used to train stages of the system. Accordingly, the process of training the machine learning likely has many steps that those skilled in the art likely would use. In addition, some of the steps may be performed in a different order than that shown or skipped altogether. Additionally, or alternatively, some of the steps may be performed at the same time. Those skilled in the art therefore can modify the process as appropriate. Indeed, it should be apparent to one of skill in the art that the process described here may be repeated for more than one stage (e.g., three-stages, four-stages)

Figure 8B:
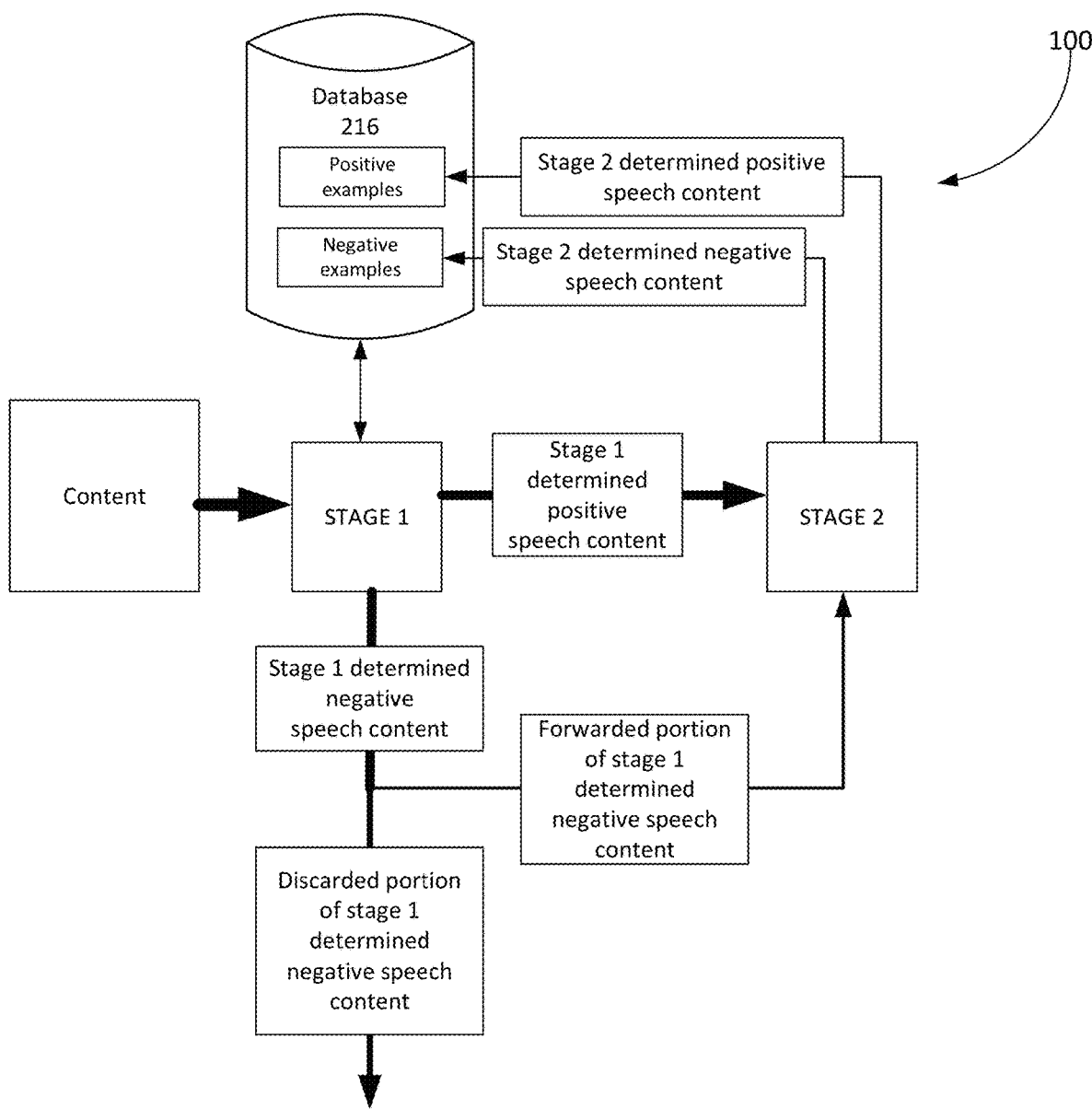
FIG. 8B schematically shows a system for training the machine learning of FIG. 8A in accordance with illustrative embodiments of the invention.

FIG. 8B schematically shows a system for training the machine learning of FIG. 8A in accordance with illustrative embodiments of the invention. Furthermore, discussion of specific example implementations of training stages with reference to FIG. 8B are for the sake of discussion, and not intended to limit various embodiments. One of skill in the art understands that the training of the stages and the various components and interactions of the stages may be adjusted, removed, and/or added to, while still developing a working toxicity moderation system 100 in accordance with illustrative embodiments.

The process 800 begins at step 802, which provides a multi-stage content analysis system, such as the system 100 in FIG. 8B. At step 804, machine learning training is run using the database 216 having training data with examples of positive and negative examples of training content. For example, for a toxicity moderation system, the positive examples may include speech clips with toxicity, and the negative examples may include speech clips without toxicity.

At step 806, the first stage analyzes received content to produce first-stage positive determinations (S1-positive), and also to produce first-stage negative (S1-negative) determinations for the received speech content. Accordingly, based on the training the first stage received in step 804, it may determine that received content is likely to be positive (e.g., contains toxic speech) or is likely to be negative (e.g., does not contain toxic speech). The associated S1-positive content is forwarded to a subsequent stage. The associated S1-negative content may have a portion discarded and a portion forwarded to the subsequent stage (e.g., using the uploader described previously).

At step 808, the S1-positive content is analyzed using the second stage, which produces its own second-stage positive (S2-positive) determinations, and also produces second-stage negative (S2-negative) determinations. The second stage is trained differently from the first stage, and therefore, not all content that is S1-positive will be S2-positive, and vice-versa.

At step 810, the S2-positive content and the S2-negative content are used to update the training of the first stage (e.g., in the database 216). In illustrative embodiments, the updated training provides decreases in false positives from the first stage. In some embodiments, the false negatives may also decrease as a result of step 810. For example, suppose that the S2-positive and S2-negative breakdown is much easier to determine than the existing training examples (if we were starting out with some low-quality training examples)—this could lead the first stage 115 towards having an easier time learning overall, decreasing the false negatives as well).

At step 812, the forwarded portion of the S1-negative content is analyzed using the second stage, which again produces its own second-stage positive (S2-positive) determinations, and also produces second-stage negative (S2-negative) determinations. At step 814, the S2-positive content and the S2-negative content are used to update the training of the first stage (e.g., in the database 216). In illustrative embodiments, the updated training provides decreases in false negatives from the first stage. Similarly, in some embodiments, the false positives decrease as well as a result of step 812.

The process then moves to step 816, which asks whether the training should be updated by discarding old training data. By discarding old training data, periodically, and retraining the first stage 115, it is possible to look at performance changes of old vs. new data and determine if the accuracy of the increase by removing old less accurate training data. One skilled in the art will understand that, in various embodiments, various stages may be retrained adaptively on the go, or at a prescheduled time. Furthermore, the training data in the database 216 may occasionally be refreshed, updated, and/or discarded to allow for the shift in the input distribution of a subsequent stage 115, given that the previous stage's 115 output distribution evolves with training. In some embodiments, the evolution of the previous stage 115 may undesirably impact the types of input that a subsequent stage 115 sees, and negatively impact the training of the subsequent stages 115. Accordingly, illustrative embodiments may update and/or discard portions, or all, of the training data periodically.

If there is no update to the training at step 816, the training process comes to an end.

Various embodiments of the invention may be implemented at least in part in any conventional computer programming language. For example, some embodiments may be implemented in a procedural programming language (e.g., "C"), as a visual programming process, or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., as in any methods, flow charts, or logic flows described above) may be implemented as a computer program product for use with a computer system. Such implementation may include a series of computer instructions fixed either on a tangible, non-transitory, non-transient medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory devices, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Illustrative embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems are necessarily non-conventional because, absent special programming or configuration, the conventional components do not inherently perform the described non-conventional functions.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the above discussion discloses various exemplary embodiments of the invention, it should be apparent that those skilled in the art can make various modifications that will achieve some of the advantages of the invention without departing from the true scope of the invention.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, potential subject matter that may be claimed (prefaced with the letter "P" so as to avoid confusion with the actual claims presented below) includes:

P1. A toxicity moderation system, the system comprising
an input configured to receive speech from a speaker;
a multi-stage toxicity machine learning system including
a first stage and a second stage, wherein the first stage is trained to analyze the received speech to determine whether a toxicity level of the speech meets a toxicity threshold,
the first stage configured to filter-through, to the second stage, speech that meets the toxicity threshold, and further configured to filter-out speech that does not meet the toxicity threshold.

P2. The toxicity moderation system of claim 1, wherein the first stage is trained using a database having training data with positive and/or negative examples of training content for the first stage.

P3. The toxicity moderation system of claim 2, wherein the first stage is trained using a feedback process comprising:
receiving speech content;
analyzing the speech content using the first stage to categorize the speech content as having first-stage positive speech content and/or first-stage negative speech content;
analyzing the first-stage positive speech content using the second stage to categorize the first-stage positive speech content as having second-stage positive speech content and/or second-stage negative speech content; and
updating the database using the second-stage positive speech content and/or the second-stage negative speech content.

P4. The toxicity moderation system of claim 3, wherein the first stage discards at least a portion of the first-stage negative speech content.

P5. The toxicity moderation system of claim 3, wherein the first stage is trained using the feedback process further comprising:
analyzing less than all of the first-stage negative speech content using the second stage to categorize the first-stage negative speech content as having second-stage positive speech content and/or second-stage negative speech content.
further updating the database using the second-stage positive speech content and/or the second-stage negative speech content.

P6. The toxicity moderation system of claim 1, further comprising a random uploaded configured to upload portions of the speech that did not meet the toxicity threshold to the subsequent stage or a human moderator.

P7. The toxicity moderation system of claim 1, further comprising a session context flagger configured to receive an indication that the speaker previously met the toxicity threshold within a pre-determined amount of time, and to: (a) adjust the toxicity threshold, or (b) upload portions of the speech that did not meet the toxicity threshold to the subsequent stage or a human moderator.

P8. The toxicity moderation system of claim 1, further comprising a user context analyzer, the user context analyzer configured to adjust the toxicity threshold and/or the toxicity confidence based on the speaker's age, a listener's age, the speaker's geographic region, the speaker's friends list, history of recently interacted listeners, speaker's gameplay time, length of speaker's game, time at beginning of game and end of game, and/or gameplay history.

P9. The toxicity moderation system of claim 1, further comprising an emotion analyzer trained to determine an emotion of the speaker.

P10. The toxicity moderation system of claim 1, further comprising an age analyzer trained to determine an age of the speaker.

P11. The toxicity moderation system of claim 1, further comprising a temporal receptive field configured to divide speech into time segments that can be received by at least one stage.

P12. The toxicity moderation system of claim 1, further comprising a speech segmenter configured to divide speech into time segments that can be analyzed by at least one stage.

P13. The toxicity moderation system of claim 1, wherein the first stage is more efficient than the second stage.

P14. A multi-stage content analysis system comprising:
a first stage trained using a database having training data with positive and/or negative examples of training content for the first stage,
the first stage configured to:
receive speech content,
analyze the speech content to categorize the speech content as having first-stage positive speech content and/or first-stage negative speech content;
a second stage configured to receive at least a portion, but less than all, of the first-stage negative speech content,
the second stage further configured to analyze the first-stage positive speech content to categorize the first-stage positive speech content as having second-stage positive speech content and/or second-stage negative speech content, the second stage further configured to update the database using the second-stage positive speech content and/or the second-stage negative speech content.

P15. The multi-stage content analysis system of claim 14, wherein:
the second stage is configured to analyze the received first-stage negative speech content to categorize the first-stage negative speech content as having second-stage positive speech content and/or second-stage negative speech content.

P16. The multi-stage content analysis system of claim 15, wherein:
the second stage is configured to update the database using the second-stage positive speech content and/or the second-stage negative speech content.

P17. A method of training a multi-stage content analysis system, the method comprising:
providing a multi-stage content analysis system, the system having a first stage and a second stage;
training the first stage using a database having training data with positive and/or negative examples of training content for the first stage;
receiving speech content;
analyzing the speech content using the first stage to categorize the speech content as having first-stage positive speech content and/or first-stage negative speech content;
analyzing the first-stage positive speech content using the second stage to categorize the first-stage positive speech content as having second-stage positive speech content and/or second-stage negative speech content;
updating the database using the second-stage positive speech content and/or the second-stage negative speech content;
discarding at least a portion of the first-stage negative speech content.

P18. The method of claim 17, the method comprising:
analyzing less than all of the first-stage negative speech content using the second stage to categorize the first-stage negative speech content as having second-stage positive speech content and/or second-stage negative speech content.
further updating the database using the second-stage positive speech content and/or the second-stage negative speech content.

P19. The method of claim 18, further comprising:
using a database having training data with positive and/or negative examples of training content for the first stage;
producing first-stage positive determinations ("S1-positive determinations") associated with a portion of the speech content, and/or first-stage negative determinations ("S1-negative determinations");
analyzing the speech associated with the S1-positive determinations P20. The method of claim 19, wherein the positive and/or negative examples relate to particular categories of toxicity.

P21. A moderation system for managing content, the system comprising:
a plurality of successive stages arranged in series, each stage configured to receive input content and filter the input content to produce filtered content, a plurality of the stages each configured to forward the filtered content toward a successive stage; and
training logic operatively coupled with the stages, the training logic configured to use information relating to speech toxicity processing by a given subsequent stage to train speech toxicity processing of an earlier stage, the given subsequent stage receiving content derived directly from the earlier stage or from at least one stage between the given subsequent stage and the earlier stage.

P22. The system of claim 21 wherein the filtered content of each stage comprises a subset of the received input content.

P23. The system of claim 21 wherein each stage is configured to produce filtered content from input content to forward to a less efficient stage, a given less efficient stage being more powerful than a second more efficient stage.

P24. The system of claim 21 wherein at least one stage of the plurality of successive stages is configured to receive forwarded content from a prior stage and send forwarded content to a later stage.

P25. The system of claim 21 wherein the plurality of successive stages together have a maximum moderation capacity, one stage having the most efficient stage and having the highest percentage of the maximum moderation capacity.

P26. The system of claim 21 wherein a first and second stages execute on a user device, a third and fourth stage execute off-device, the first and second stages executing more moderation capacity than that of the third and fourth stages.

P27. The system of claim 21 further having a user interface to receive input from at least one stage and verify processing by one or more of the plurality of stages.

P28. The system of claim 21 wherein the training logic is executed as a computer program product comprising a tangible medium storing program code.

P29. A moderation system comprising:
a plurality of successive stages arranged in series from most efficient stage to least efficient stage of the plurality of stages, each stage configured to produce forwarded content from input content to forward to a less efficient stage; and
training logic operatively coupled with the stages, the training logic configured to use information relating to processing by a given stage to train processing of a second stage that is adjacent and more efficient at processing than the given stage.

P30. The moderation system of claim 29 wherein at least one stage of the plurality of successive stages is configured to receive forwarded content from a prior stage and send forwarded content to a later stage.

P31. The moderation system of claim 29 wherein the plurality of successive stages together have a maximum moderation capacity, the most efficient stage having the highest percentage of the maximum moderation capacity.

P32. The moderation system of claim 29 wherein a first and second stages execute on a user device, a third and fourth stage executing off-device, the first and second stages executing more moderation capacity than that of the third and fourth stages.

P33. The moderation system of claim 29 further having a user interface to receive input from the least efficient stage and verify processing by one or more of the plurality of stages.

P34. The moderation system of claim 29 wherein the training logic is executed as a computer program product comprising a tangible medium storing program code.

P35. A computer program product for use on a computer system for training a multi-stage content analysis system, the computer program product comprising a tangible, non-transient computer usable medium having computer readable program code thereon, the computer readable program code comprising:
program code for providing a multi-stage content analysis system, the system having a first stage and a second stage;
program code for training the first stage using a database having training data with positive and/or negative examples of training content for the first stage;
program code for receiving speech content;
program code for analyzing the speech content using the first stage to categorize the speech content as having first-stage positive speech content and/or first-stage negative speech content;
program code for analyzing the first-stage positive speech content using the second stage to categorize the first-stage positive speech content as having second-stage positive speech content and/or second-stage negative speech content;
program code for updating the database using the second-stage positive speech content and/or the second-stage negative speech content;
program code for discarding at least a portion of the first-stage negative speech content.

P36. The computer program product of claim 35, the program code comprising:
program code for analyzing less than all of the first-stage negative speech content using the second stage to categorize the first-stage negative speech content as having second-stage positive speech content and/or second-stage negative speech content.
program code for further updating the database using the second-stage positive speech content and/or the second-stage negative speech content.

P37. The computer program product of claim 35, the program code comprising:
program code for using a database having training data with positive and/or negative examples of training content for the first stage;
program code for producing first-stage positive determinations ("S1-positive determinations") associated with a portion of the speech content, and/or first-stage negative determinations ("S1-negative determinations");
program code for analyzing the speech associated with the S1-positive determinations.

P38. A computer program product for use on a computer system for moderating toxicity, the computer program product comprising a tangible, non-transient computer usable medium having computer readable program code thereon, the computer readable program code comprising:
program code for a multi-stage content analysis system comprising:
program code for a first stage trained using a database having training data with positive and/or negative examples of training content for the first stage,
the first stage configured to:
receive speech content,
analyze the speech content to categorize the speech content as having first-stage positive speech content and/or first-stage negative speech content;
program code for a second stage configured to receive at least a portion, but less than all, of the first-stage negative speech content,
the second stage further configured to analyze the first-stage positive speech content to categorize the first-stage positive speech content as having second-stage positive speech content and/or second-stage negative speech content, the second stage further configured to update the database using the second-stage positive speech content and/or the second-stage negative speech content.

P39. The computer program product of claim 38, wherein the second stage is configured to analyze the received first-stage negative speech content to categorize the first-stage negative speech content as having second-stage positive speech content and/or second-stage negative speech content.

P40. A computer program product for use on a computer system for a toxicity moderation system, the computer program product comprising a tangible, non-transient computer usable medium having computer readable program code thereon, the computer readable program code comprising:
program code for a toxicity moderation system, the system comprising
program code for an input configured to receive speech from a speaker;

program code for a multi-stage toxicity machine learning system including a first stage and a second stage, wherein the first stage is trained to analyze the received speech to determine whether a toxicity level of the speech meets a toxicity threshold, program code for the first stage configured to filter-through, to the second stage, speech that meets the toxicity threshold, and further configured to filter-out speech that does not meet the toxicity threshold.

P41. The toxicity moderation system of claim 40, wherein the first stage is trained using a database having training data with positive and/or negative examples of training content for the first stage.

P42. The toxicity moderation system of claim 41, wherein the first stage is trained using a feedback process comprising:

program code for receiving speech content;

program code for analyzing the speech content using the first stage to categorize the speech content as having first-stage positive speech content and/or first-stage negative speech content;

program code for analyzing the first-stage positive speech content using the second stage to categorize the first-stage positive speech content as having second-stage positive speech content and/or second-stage negative speech content; and program code for updating the database using the second-stage positive speech content and/or the second-stage negative speech content.

What is claimed is:

1. A toxicity moderation system, the system comprising an input configured to receive speech from a speaker;
a multi-stage toxicity machine learning system including a first stage and a second stage, wherein the first stage is trained to analyze the received speech to determine whether a toxicity level of the speech meets a toxicity threshold,
the first stage configured to filter-through, to the second stage, speech that meets the toxicity threshold, and further configured to filter-out speech that does not meet the toxicity threshold.

2. The toxicity moderation system of claim 1, wherein the first stage is trained using a database having training data with positive and/or negative examples of training content for the first stage.

3. The toxicity moderation system of claim 2, wherein the first stage is trained using a feedback process comprising:
receiving speech content;
analyzing the speech content using the first stage to categorize the speech content as having first-stage positive speech content and/or first-stage negative speech content;
analyzing the first-stage positive speech content using the second stage to categorize the first-stage positive speech content as having second-stage positive speech content and/or second-stage negative speech content; and
updating the database using the second-stage positive speech content and/or the second-stage negative speech content.

4. The toxicity moderation system of claim 3, wherein the first stage discards at least a portion of the first-stage negative speech content.

5. The toxicity moderation system of claim 3, wherein the first stage is trained using the feedback process further comprising:

analyzing less than all of the first-stage negative speech content using the second stage to categorize the first-stage negative speech content as having second-stage positive speech content and/or second-stage negative speech content, further updating the database using the second-stage positive speech content and/or the second-stage negative speech content.

6. The toxicity moderation system of claim 1, further comprising a random uploaded configured to upload portions of the speech that did not meet the toxicity threshold to the subsequent stage or a human moderator.

7. The toxicity moderation system of claim 1, further comprising a session context flagger configured to receive an indication that the speaker previously met the toxicity threshold within a pre-determined amount of time, and to: (a) adjust the toxicity threshold, or (b) upload portions of the speech that did not meet the toxicity threshold to the subsequent stage or a human moderator.

8. The toxicity moderation system of claim 1, further comprising a user context analyzer, the user context analyzer configured to adjust the toxicity threshold and/or the toxicity confidence based on the speaker's age, a listener's age, the speaker's geographic region, the speaker's friends list, history of recently interacted listeners, speaker's gameplay time, length of speaker's game, time at beginning of game and end of game, and/or gameplay history.

9. The toxicity moderation system of claim 1, further comprising an emotion analyzer trained to determine an emotion of the speaker.

10. The toxicity moderation system of claim 1, further comprising an age analyzer trained to determine an age of the speaker.

11. The toxicity moderation system of claim 1, further comprising a temporal receptive field configured to divide speech into time segments that can be received by at least one stage.

12. The toxicity moderation system of claim 1, further comprising a speech segmenter configured to divide speech into time segments that can be analyzed by at least one stage.

13. The toxicity moderation system of claim 1, wherein the first stage is more efficient than the second stage.

14. A multi-stage content analysis system comprising:
a first stage trained using a database having training data with positive and/or negative examples of training content for the first stage,
the first stage configured to:
receive speech content,
analyze the speech content to categorize the speech content as having first-stage positive speech content and/or first-stage negative speech content;
a second stage configured to receive at least a portion, but less than all, of the first-stage negative speech content,
the second stage further configured to analyze the first-stage positive speech content to categorize the first-stage positive speech content as having second-stage positive speech content and/or second-stage negative speech content, the second stage further configured to update the database using the second-stage positive speech content and/or the second-stage negative speech content.

15. The multi-stage content analysis system of claim 14, wherein:
the second stage is configured to analyze the received first-stage negative speech content to categorize the first-stage negative speech content as having second-stage positive speech content and/or second-stage negative speech content.

16. The multi-stage content analysis system of claim 15, wherein:
the second stage is configured to update the database using the second-stage positive speech content and/or the second-stage negative speech content.

17. A method of training a multi-stage content analysis system, the method comprising:
providing a multi-stage content analysis system, the system having a first stage and a second stage;
training the first stage using a database having training data with positive and/or negative examples of training content for the first stage;
receiving speech content;
analyzing the speech content using the first stage to categorize the speech content as having first-stage positive speech content and/or first-stage negative speech content;
analyzing the first-stage positive speech content using the second stage to categorize the first-stage positive speech content as having second-stage positive speech content and/or second-stage negative speech content;
updating the database using the second-stage positive speech content and/or the second-stage negative speech content;
discarding at least a portion of the first-stage negative speech content.

18. The method of claim 17, the method comprising:
analyzing less than all of the first-stage negative speech content using the second stage to categorize the first-stage negative speech content as having second-stage positive speech content and/or second-stage negative speech content,
further updating the database using the second-stage positive speech content and/or the second-stage negative speech content.

19. The method of claim 18, further comprising:
using a database having training data with positive and/or negative examples of training content for the first stage;
producing first-stage positive determinations ("S1-positive determinations") associated with a portion of the speech content, and/or first-stage negative determinations ("S1-negative determinations");
analyzing the speech associated with the S1-positive determinations.

20. The method of claim 19, wherein the positive and/or negative examples relate to particular categories of toxicity.

* * * * *